(12) United States Patent
Zeineh

(10) Patent No.: US 6,943,701 B2
(45) Date of Patent: Sep. 13, 2005

(54) VEHICULAR SAFETY SYSTEM AND METHOD

(75) Inventor: Rashid A. Zeineh, Fullerton, CA (US)

(73) Assignee: Advanced American Enterprises, LLC, Fullerton, CA (US)

( * ) Notice: Subject to any disclaimer, the term of this patent is extended or adjusted under 35 U.S.C. 154(b) by 24 days.

(21) Appl. No.: 10/165,782

(22) Filed: Jun. 6, 2002

(65) Prior Publication Data

US 2003/0227395 A1 Dec. 11, 2003

(51) Int. Cl.[7] .............................................. G08G 1/12
(52) U.S. Cl. ...................... 340/988; 340/903; 340/936; 701/11; 701/14; 701/120; 701/301
(58) Field of Search .................................. 340/903, 929, 340/988, 989, 936, 905, 996, 539, 961; 701/3, 14, 11, 301, 119, 120, 121, 200, 210, 213

(56) References Cited

U.S. PATENT DOCUMENTS

| | | | | |
|---|---|---|---|---|
| 5,952,941 A | * | 9/1999 | Mardirossian | 340/936 |
| 6,144,915 A | * | 11/2000 | Shiomi et al. | 701/120 |
| 6,246,948 B1 | * | 6/2001 | Thakker | 701/93 |
| 6,420,996 B1 | * | 7/2002 | Stopczynski et al. | 340/435 |
| 6,484,078 B1 | * | 11/2002 | Kageyama | 701/25 |
| 6,516,273 B1 | * | 2/2003 | Pierowicz et al. | 701/301 |
| 6,559,769 B2 | * | 5/2003 | Anthony et al. | 340/574 |
| 6,566,999 B2 | * | 5/2003 | Iwasaki et al. | 340/435 |
| 2003/0055540 A1 | * | 3/2003 | Hansen | 701/3 |

OTHER PUBLICATIONS

Bretz, Elizabeth A., "Cleark Skies Ahead", IEEE Spectrum, vol. 39 No. 1, pp. 78–81, Jan. 2002.
Jones, Willie, D., "Building Safer Cars", IEEE Spectrum, vol. 39 No. 1, pp. 78–81, Jan. 2002.

* cited by examiner

*Primary Examiner*—Davetta W. Goins
(74) *Attorney, Agent, or Firm*—Gregory L. Roth

(57) ABSTRACT

A relatively low cost but effective vehicular safety system includes a navigational status determination system generating navigational status information, an alarm response system generating alarm responses in response to alarm response command information and a data processing system. The data processing system stores a list of safety zones having one or more safety conditions for each safety zone. The data processing system receives the navigational status information and compares the received navigational status information to the stored safety conditions. If a safety condition is found to be violated the data processing system communicates a response command to the alarm response system. Depending upon the severity of the violated safety condition, the alarm response system notifies the vehicle operator of the violation, notifies law enforcement authorities external to the vehicle of the violation or takes some other safety response. In an extreme condition, the alarm response system assumes control over some aspect of the operation of the vehicle such as steering or engine control.

90 Claims, 11 Drawing Sheets

FIG. 6

VEHICULAR SAFETY SYSTEM AND METHOD

BACKGROUND OF THE INVENTION

Since the terrorist attacks on the World Trade Center in New York City and the Pentagon on Sep. 11, 2001, huge sums of money have been spent to deter similar terrorist attacks on power plants, large buildings, Government buildings and monuments and other sensitive objects. Steps to deter further attacks have included careful screening of passengers and luggage before boarding an airplane or ship, use of barricades to prevent motor vehicles from getting too close to sensitive locations, and placement of military and local police officers at airports and other sensitive locations to provide additional security. It is understood that for a time, fighter jets were constantly in the air in the United States, prepared to shoot down any airliner or other airplane that violated "no entry zones" around sensitive locations.

However, no matter how tight the security, there is always a danger that a person with security clearance will become a terrorist or that a terrorist will penetrate the increased security with an explosive device or with a weapon that would enable the terrorist to hijack a vehicle such as an airplane, a truck, a trailer/cargo container or a ship and use the vehicle itself as a weapon.

Further need therefor exists for an inexpensive system that can protect power plants, buildings, national monuments and other objects from intentional or accidental collisions and close approaches by vehicles that might damage the protected objects. Protection of the vehicle itself as well as the people on board the vehicle is also important. Such a system should minimize the risk of injury to innocent passengers in the vehicle while providing reliable protection to both the vehicle and protected objects.

SUMMARY OF THE INVENTION

An affordable, reliable vehicular safety system in accordance with the invention includes a navigational status determination system generating navigational status information for a vehicle, a data processing system storing map information, storing information representing navigational conditions and generating alarm information in response to the navigational status information and the stored information representing navigational conditions when a navigational condition is violated by the vehicle and an alarm response system generating a protective safety response in response to the alarm information. The safety system optionally includes a communication system communicating navigational conditions and information between the vehicle and one or more external stations such aircraft controllers and law enforcement personnel. The navigational status determination system must determine vehicle position and optionally other navigational information with sufficient accuracy and reliability to implement a practical object protection system, but may vary in complexity from a simple Global Positioning System (GPS) receiver to a sophisticated aircraft flight monitoring system using a Kallman filter to process multiple navigational status inputs from accelerometers, gyroscopes, altimeters, compasses, radio frequency navigation signals or other sensors producing navigational status information.

The data processing system includes a data store storing sets of navigational condition information defining rules for operation of the vehicle and has sufficient processing capability to receive navigational status information from the navigational status determination system and determine whether the vehicle has violated one or more of the rules defined by the stored protection definition information. The navigational condition information may define one or more protective safety zones and a set of conditions for each safety zone. Upon determining that the vehicle has violated a defined rule or condition, the data processing system generates alarm information defining an alarm signal that indicates an alarm response. The alarm response system responds to the alarm information by generating an appropriate response which might include notification of the vehicle operator, notification of aircraft controllers of law enforcement authorities outside the vehicle or overriding operator control the operation of the vehicle.

In one embodiment three concentric safety zones are established around objects for protection of the objects from the vehicle or protection of the vehicle from the objects. Typical objects include nuclear reactors, power plants and mountain peaks. The safety zones are exclusive safety zones having the associated condition that the vehicle must not enter the safety zone. As the vehicle does enter successive early warning, general warning and operator override vehicle control safety zones the safety system respectively warns the vehicle operator of the violation, warns aircraft controllers or law enforcement personnel of the violation and overrides operator control to prevent further penetration of the safety zone by the vehicle or to force the vehicle to exit the safety zone. Possible operator override responses include decelerating or stopping the vehicle, forcing a left or right turn or, in the case of an airplane, forcing the airplane to climb above a safe, minimum floor altitude. As one option, a gentle left or right turn can be imposed on the vehicle for a predetermined period of time such as a time in the range of 2–10 seconds.

In other arrangements a vehicle is permitted to enter a safety zone, but conditions are imposed on operation of the vehicle within the safety zone. For example, a speed limit might be imposed or a vehicle may have permission to enter a safety zone only if the safety system contains a certification that the vehicle has been inspected or that a specially trained operator is on board. Entry of a secret code or password may be imposed as a condition for starting the vehicle, moving the vehicle from a parked position, or crossing a safety zone boundary to enter or leave the safety zone. Restrictions may be placed on vehicle operation in the absence of an enabling command or password transmitted by a station external to the vehicle and received by the vehicle communication system.

Some safety zones may be inclusive safety zones that require a vehicle to remain within the zone and generate an appropriate alarm response if the vehicle attempts to leave the zone. The purpose of an exclusive safety zone is to constrain a vehicle to remain on a selected path or roadway, not serve as an automatic pilot controlling the instantaneous operation of the vehicle. Boundaries of safety zones are defined about intended routes with sufficient distance on either side of a widest allowable path that normal errors in determining the location of the vehicle should not produce an indication of a boundary violation. For example, establishing safety zones for a truck along a truck route with zone boundaries 100 feet or more on either side of a road or highway serving as the truck route would not deprive a truck operator of normal control of the truck as the truck is driven along the truck route given the achievable accuracy using present day low cost technology. At the same time, a safety zone violation would quickly occur and be detected if the truck were driven off the truck route and onto another road or highway.

A vehicular safety method in accordance with the invention includes determining a current navigational status of the vehicle, storing one or more sets of protection definition information defining rules or conditions for vehicle operation, determining whether or not the vehicle has violated a condition defined by a set of protection definition information, generating alarm information whenever it is determined that the vehicle has violated a protection definition and initiating a protective response in response to the alarm information. The protection definition information is typically organized to provide safety zones to protect the vehicle from objects or objects from the vehicle. One or more conditions is associated with each safety zone. Each safety zone imposes one or more conditions on the operation of the vehicle. A safety zone may be referred to as an exclusive zone when an associated condition is that the vehicle should not enter the zone or as an inclusive zone when an associated condition is that the vehicle should not leave the zone. Safety rules such as speed limits or a requirement for operation of a vehicle by specially trained operators may be imposed on the operation of a vehicle within a safety zone.

The appropriate response to a violation of a condition associated with a safety zone may vary with the character of the set of protection definition information or rule that has been violated. For example, the set of protection definition information may define one or more exclusive protective zones that surround a protected object, each zone having an associated protective response that varies with the sensitivity of the protected object within the protective zone, the distance of the zone boundary from the protected object and the type of vehicle involved. For example, in one embodiment a protected object is protected by a plurality of concentric protective zones that evoke different responses when penetrated by the vehicle, the protective condition or rule being that a vehicle should not enter the zone. The outermost zone is an early warning zone which invokes a visual or audible warning to a vehicle operator that the early warning zone has been penetrated, thereby allowing evasive action to be taken by the vehicle operator to move the vehicle out of the early warning zone without further incident.

Penetration of a next closer general warning zone invokes communication to an extra-vehicular monitoring station, such as a ground based station, of a warning that the general warning zone has been entered by the vehicle. Such a warning allows ground based personnel to communicate with the vehicle operator, alert military aircraft of the penetration and take other appropriate action.

Penetration of a still closer automatic response zone causes the alarm response system to override operator control of the vehicle and control the motion of the vehicle. If the vehicle is an airplane it is steered out of the automatic response zone or forced to a higher altitude above the automatic response zone if the zone has an altitude limit or ceiling. If the vehicle is a ship or an automobile (such as a car or truck) it is steered away from the automatic response zone if safe to do so. In one simplified embodiment the vehicle is forced to steer left for a predetermined period of time. If a fixed steering command is unsafe, the automatic response system may stop the vehicle engine or engines, apply the vehicle brakes when appropriate or allow operation of the vehicle only in reverse or in a safe direction.

A vehicular safety system may be mounted on certain classes of vehicles posing a particular threat in order to impose special restrictions or to create special anti terrorism alerts or warnings with respect to those vehicles. For example, the vehicular safety system may be installed on rented trucks with safety zones established around special landmarks such as the Golden Gate Bridge, a Senate building or other government buildings or airports. If the vehicle enters one of the safety zones law enforcement authorities are alerted by facsimile transmission, e-mail, voice mail or other means of the potential danger and the period of time that will be required for the vehicle to reach the protected object.

BRIEF DESCRIPTION OF THE DRAWINGS

A better understanding of the invention may be had from a consideration of the following Detailed Description, taken in conjunction with the accompanying drawings in which:

FIG. 6 is a graphical illustration of a monitor display used in the vehicular safety system shown in FIG. 1;

DETAILED DESCRIPTION

Figure 1:
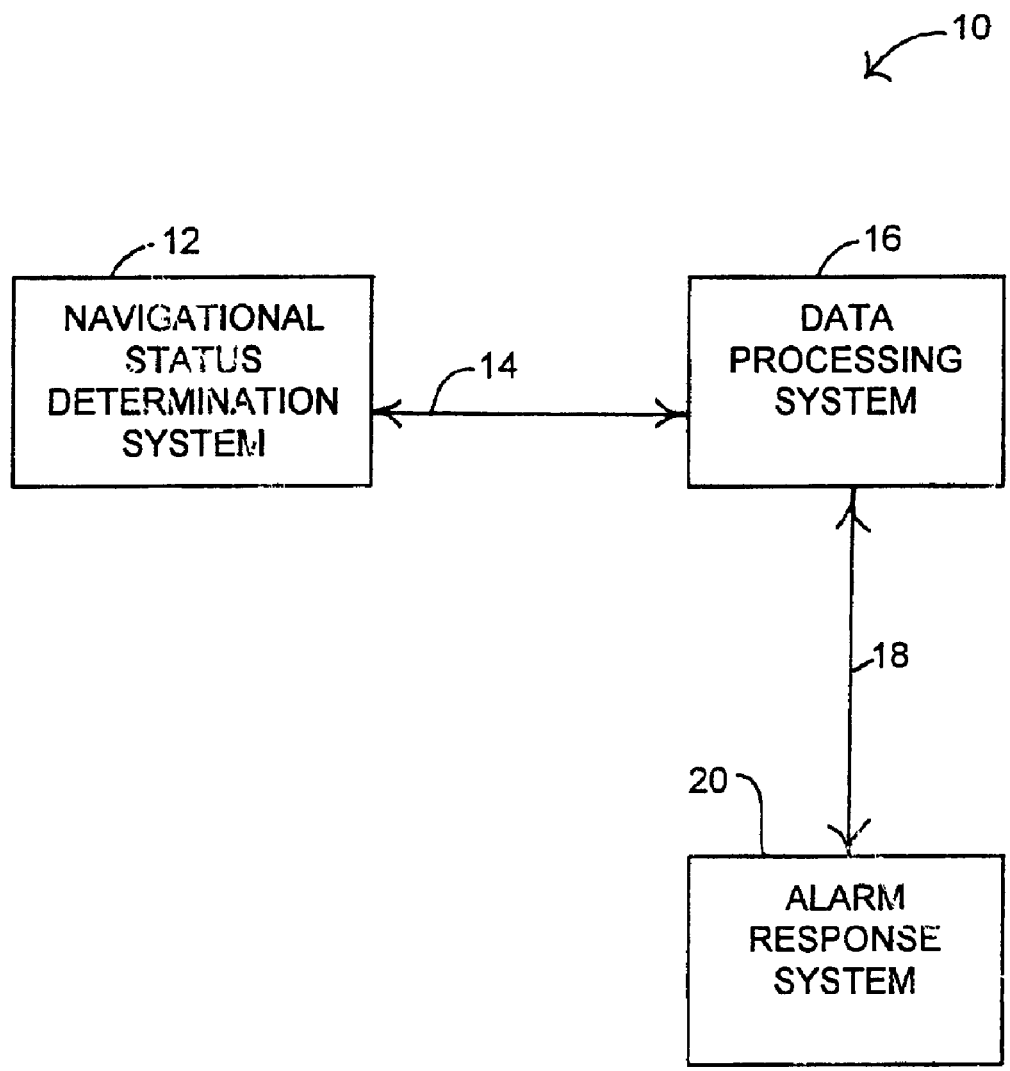
FIG. 1 is a block diagram representation of a vehicular safety system in accordance with the invention.

Referring now to FIG. 1, a vehicular safety system 10 in accordance with the invention includes a navigational status determination system 12 generating navigational status information over a signal path 14, a data processing system 16 generating alarm information over signal path 18 in response to the navigational status information and an alarm response system 20 generating a safety response in response to the alarm information. The vehicular safety system 10 protects objects external of the vehicle from damage by the vehicle while also protecting the vehicle along with its passengers and other contents from damage resulting from collisions with external objects.

In one arrangement the navigation status determination system 12, which is mounted on the vehicle, is a Global Positioning System (GPS) receiver generating navigational status information and communicating the navigational status information over signal path 14 in the form of longitude, latitude and altitude information. A model GPS 12 XL GPS receiver manufactured by Garmin has been found satisfactory for such an implementation. The accuracy of such a unit, which is typically about + or −100 feet or better, is sufficient for most applications where the safety rules require the vehicle to remain outside a boundary where the boundary is sufficiently distant from any protected object that any inaccuracy in the position determination of the vehicle does not impair the safety function of the system.

For example, for most applications it should be sufficient from the standpoint of protecting against position determination errors, that the protective boundary be established at a distance from the protected object that is at least 5 to 10 times the amount of any expected error in the position determination.

Alternatively, the navigational status determination system 12 may be implemented as a more sophisticated system producing more complete, more reliable and more accurate navigational status information 14. For example, when the vehicular safety system 10 is implemented on a commercial or military aircraft, the navigational status determination system 12 may include the relatively sophisticated navigational status determination systems normally installed on such aircraft.

Figure 2:
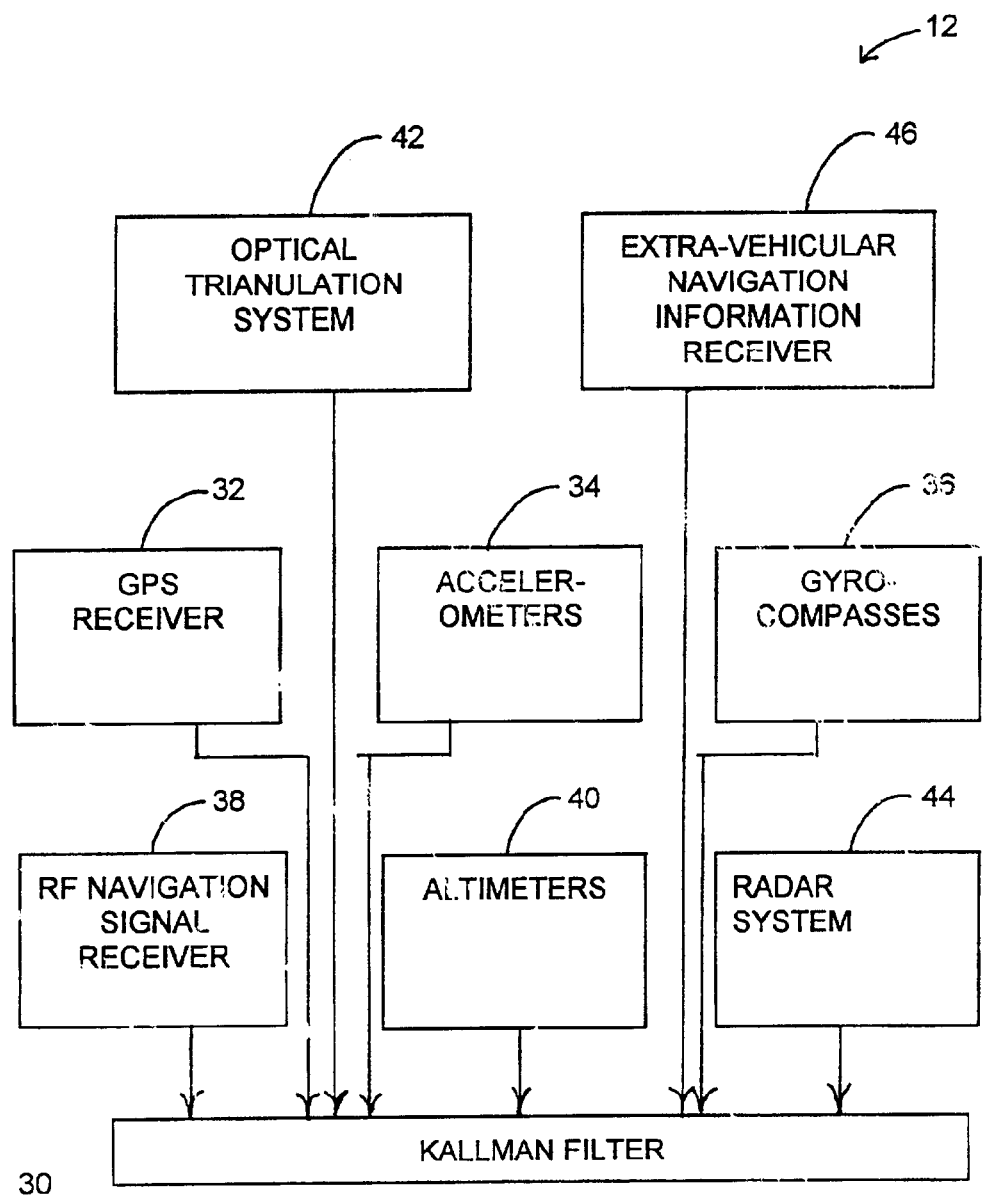
FIG. 2 is block diagram representation of a navigational status determination system used in the vehicular safety system shown in FIG. 1.

Referring now to FIG. 2, a more sophisticated implementation of the navigational status determination system 12 includes a Kallman filter generating the navigational status information 14 in response to one or more navigational information sources. The navigational information sources may include, but are not limited to, one or more of a GPS receiver 32, accelerometers 34, gyro-compasses 36, radio frequency navigational signal receivers 38, one or more altimeters 40, optical triangulation systems 42, a radar system 44 and an extra-vehicular position information system 46.

The GPS receiver 32 offers a good indication of the position and hence velocity and direction of motion of the vehicle while accelerometers 34 provide a more accurate representation of instantaneous vehicle acceleration. Integration of the acceleration information provides an alternative determination of vehicle velocity and position. The gyro-compasses 36 indicate vehicle orientation (attitude, pitch and roll) which may in turn be used to more accurately calculate vehicle direction of motion.

A radio frequency navigation signal receiver may generate motion and position status information from other positioning systems similar to GPS such as the Russian system or from GPS type transmitters that may be located on the ground or elsewhere (pseudo-lites). Such rf navigation signal receivers 38 can also include receivers for navigation system such as Loran C. Altimeters 40 may be used to provide more accurate or supplementary information about vehicle altitude while optical triangulation systems 42 provide navigation status information from triangulation from visible objects such as stars or other heavenly bodies, satellites, or even ground based objects that are recognizable and have a known position.

A radar system 44 can receive information about distance and velocity with respect to remote objects that can further be used to determine navigational status of the vehicle. Similarly, information from extra-vehicular detectors such as a ground based radar system can be communicated to the vehicle and used in the determination of the navigational status of the vehicle.

Figure 3:
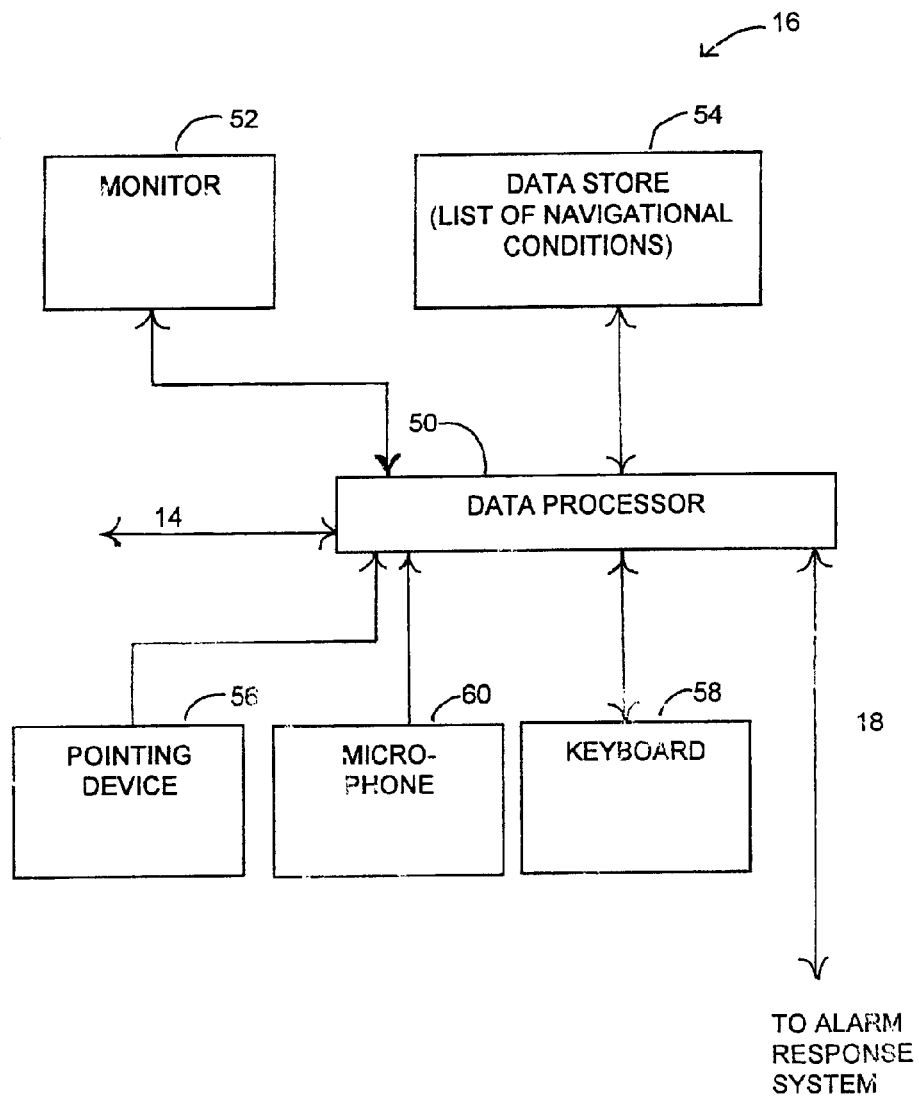
FIG. 3 is a block diagram representation of a data processing system used in the vehicular safety system shown in FIG. 1.

Referring now to FIG. 3, the data processing system 16 is located on the vehicle and preferably secured to the vehicle and includes a data processor 50 that is connected by suitable information signal paths to a monitor 52, a data store 54 storing among other things a list of navigational conditions, a pointing device 56 such as a mouse or a touch pad, a keyboard 58 and a radio receiver 60 that may optionally receive information generated external to the vehicle for controlling the operation of the data processing system 16.

Data processor 50 is located in the vehicle and preferably is mounted in a protected location that is not readily accessible by the vehicle operator, passengers or terrorists that might have access to the vehicle. Data processor 50 is preferably implemented with a "watch dog timer" or other mechanism that disrupts normal operation of the vehicle in a safe manner or generates an alert message in the event the data processor 50 is physically damaged or otherwise becomes inoperable. As various alternatives, the vehicle engine(s) can be stopped, brakes applied, alarms raised within the vehicle and alarms communicated to external personnel if the data processor 50 ceases normal operation.

Although data processing system 16 is illustrated as a separate, stand alone data processing system, it will be appreciated by those skilled in the art that some or all of data processing system 16 can be time shared with one or more other data processing system such as a flight control computer on an airplane or a GPS navigational computer on an automobile.

Data processing system 16 includes a data processor 50 and typical user interface devices including a pointing device 56 such as a mouse or touch pad, a keyboard 58, a microphone 60 for entry of voice commands and data and a monitor 52, which are connected to data processor 50 by appropriate signal paths. A data store 54 is preferably implemented as a read only memory that is not easily changed or tampered with and stores a list of navigational conditions, violation of which causes data processor 50 to issue alarm information defining an alarm condition over signal path 18 to the alarm response system 20. System status information may also be communicated over signal path 18 to alarm response system 20 and for further communication to an extra-vehicular monitoring station.

The operator input devices such as pointing device 56, keyboard 58 and microphone 60 may be used to enter a secret password or code as a condition for initiating operation of a parked vehicle such as starting the vehicle or initiating motion of the vehicle. Such passwords or codes may also be used as a condition for certain safety zones. For example entering or leaving certain safety zones without entering a password or code may be a violation of a zone condition. In the event of terrorist activity or for other reasons, an input device may receive a warning command or password causing an alarm to be communicated by communication system 74 to external center 78 or causing a condition violation which has an alarm response of notifying a center 78 external to the vehicle of the cancellation of the previously entered code or password. The entry of such a warning command may also be use to cancel the validity of any previously entered security codes or passwords. Such a warning code or command may alternatively be transmitted from a center 78 through secure communication system 74 to data processor 50.

Data processor 50 and standard user interface devices including monitor 52, pointing device 56 and keyboard 58 may be implemented as separate devices dedicated to the vehicle safety system 10, but may also be time shared with other data processing actions such as the actions performed or controlled by a flight control computer on commercial or military aircraft.

Figure 4:
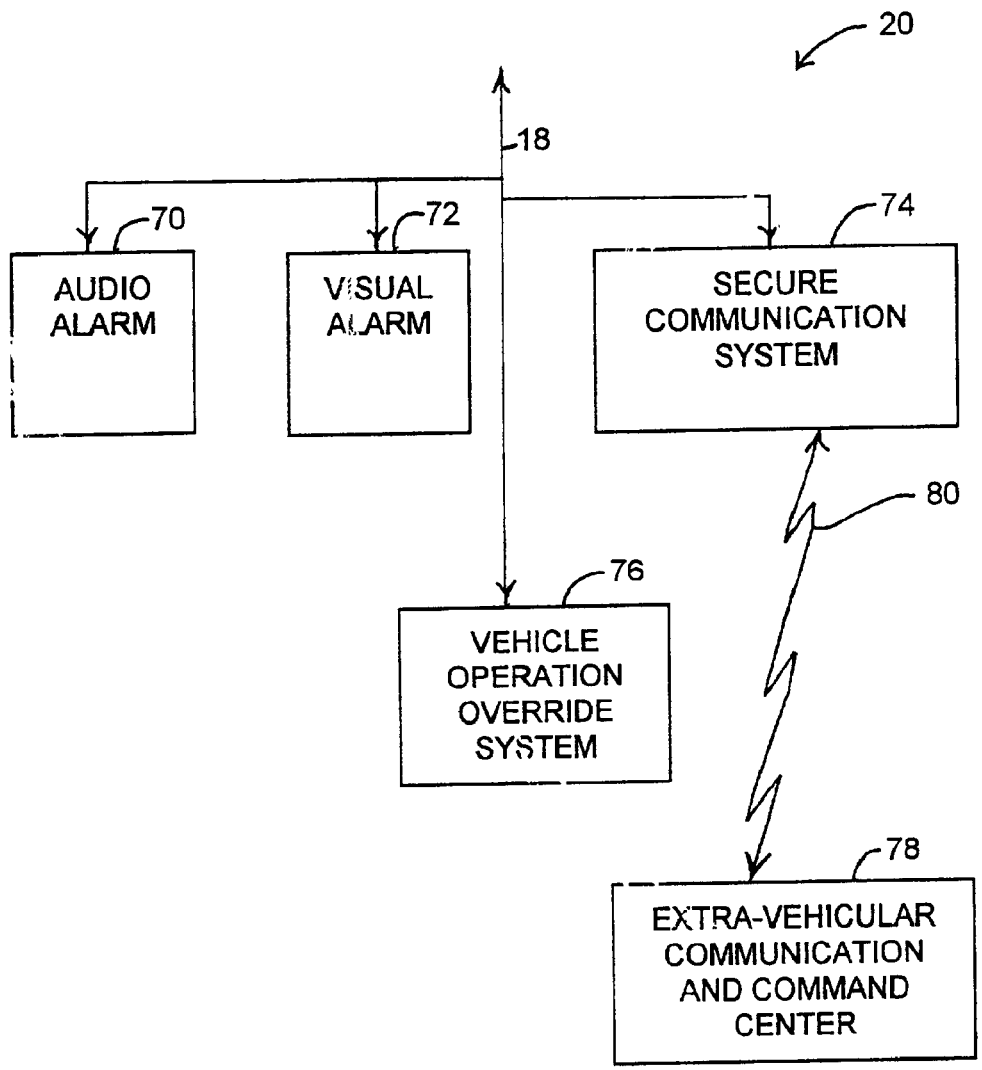
FIG. 4 is a block diagram representation of an alarm response system used in the vehicular safety system shown in FIG. 1.

Making further reference to FIG. 4, the alarm response system 20 includes an audio alarm 70, a visual alarm 72, a secure communication system 74, a vehicle operation override system 76 and one or more extra-vehicular communication and command centers 78 operated by law enforcement personnel. Each of the alarm response units 70, 72, 74, 76 is connected by signal path 18 to data processor 50. Secure communication system 74 is located on board the vehicle and is connected by a radio frequency communication link 80 with the extra-vehicular communication and command center 78, which is located outside the vehicle and preferably at a fixed location on the ground. The audio alarm 70 includes an audio speaker and, in response to a alarm command information received over signal path 18 from data processor 50, alarm 70 generates an audible warning that can be heard by the vehicle operator indicating that the vehicle has violated a navigational safety rule. In the preferred embodiment of the vehicle safety system 10, the audio alarm alternates between an audible tone and a verbal message stating that a navigational safety rule has been violated.

In the preferred embodiment 10, the visual alarm 72 is a red indicator light that can be seen by the vehicle operator and that flashes in response to alarm command information received from data processor 50 over signal path 18. In addition, monitor 52 (FIG. 3) flashes a visual warning to the vehicle operator in response to alarm command information generated by data processor 50.

The secure communication system 74 is connected by communication signal path 18 to the data processor 50 and by communication signal path 80 to extra-vehicular communication and command center 78. Secure communication system 74 is a transmitter receiver that enables communication of encrypted information as well as non-encrypted information between the host vehicle and an extra-vehicular command center 78 via communication path 80. The exact nature of communication path 80 can vary with the nature and location of the vehicle, but typically employs radio frequency communication between secure communication system 74 and an extra-vehicular transceiver located on the ground, on a communication relay satellite or elsewhere, and between the extravehicular transceiver and the extra-vehicular communication and command center 78. Secure communication system 74 provides communication of status information, alarm information and other information between data processor 50 and extra-vehicular command center 78.

Communication of alarm information to extra-vehicular communication and command center 78 alerts law enforcement personnel of a possible problem with the vehicle so that they can contact the operator of the vehicle and take other extra-vehicular precautionary actions.

Communication of a code or enabling command from an extra-vehicular communication and command center 78 to data processor 50 through secure communication system 74 may be imposed as a navigational condition for starting or initiating motion of a parked vehicle. Such a communicated command signal or code may also be imposed as a navigational condition for entering or leaving certain safety zones. For example, a harbor is established as an exclusive safety zone with a condition for entry that a security code be transmitted from a center 78 to a ship wishing to enter the harbor. However, the center 78 will transmit the code only after receiving confirmation that a harbor pilot is on board the ship and in control of ship navigation. Successive inner zones, each having additional security codes or commands and requiring repeated confirmations that there are no problems on board the ship may be imposed for additional security.

The vehicle operation override system 76 provides the mechanical linkage to actually control one or more aspects of the operation of the vehicle. Vehicle operation override system 76 responds to alarm information received over communication path 18 indicating that an alarm has been raised by the vehicle entering the restricted area of a vehicle override safety zone by changing the operation of the vehicle when an operator override safety condition has been violated. In one embodiment of the vehicular safety system 10 in which the vehicle is an automobile, the automobile is forced to turn left for a predetermined number of seconds. The mechanical advantage of the vehicle operation override system 76 is selected to over power any contrary force that might be exerted by the vehicle operator. If it is subsequently determined that the override maneuver was not sufficient to move the vehicle outside the override protective zone and remove the violation of the override safety condition or if the vehicle again violates the override safety condition, the override maneuver is repeated.

In a more sophisticated automobile base system electrical power or fuel supply to the engine is terminated or in the case of a vehicle having electronic ignition, electrical power to the electronic ignition is terminated. If necessary vehicle braking can be initiated by the vehicle operation override system 76.

If the vehicle is an airplane, the airplane is forced to turn away from (or into) the override protective zone by manipulation of the rudder or ailerons by the vehicle operation override system 76 or, if the override protective zone has an altitude ceiling or floor, the airplane is forced to rise above the altitude ceiling or floor of the override protective zone by suitable control of the engine(s) and the elevators. In the case of an airplane having mechanical connections between the pilot and the control surfaces, mechanical controls such as hydraulic or electrical motors are implemented with sufficient force to overcome any control force that might be asserted by the pilot. In the case of pilotless drone vehicles or vehicles in which a flight control computer receives navigational commands from the operator and positions the control surfaces in response to those commands, the flight control computer is simply programmed to ignore the operator commands and execute an evasive maneuver commanded by the vehicle operation override system 76 instead.

In the case of a boat or ship, the vehicle operation override system 76 is connected to terminate power to the propellers or to reverse the propellers until the boat or ship has stopped. In most cases where a land or water based vehicle has violated an operator override condition it is preferred to simply stop the motion of the vehicle until law enforcement personnel can take control of the vehicle. In other cases it may be better to force a specific maneuver such as a climb or gentle left or right turn on the vehicle operation for a fixed period of time, such as a period of time in the range of 2 to 10 seconds, inclusive. The maneuver can be repeated until the condition violation is corrected when the condition relates to the location of the vehicle.

Figure 5:
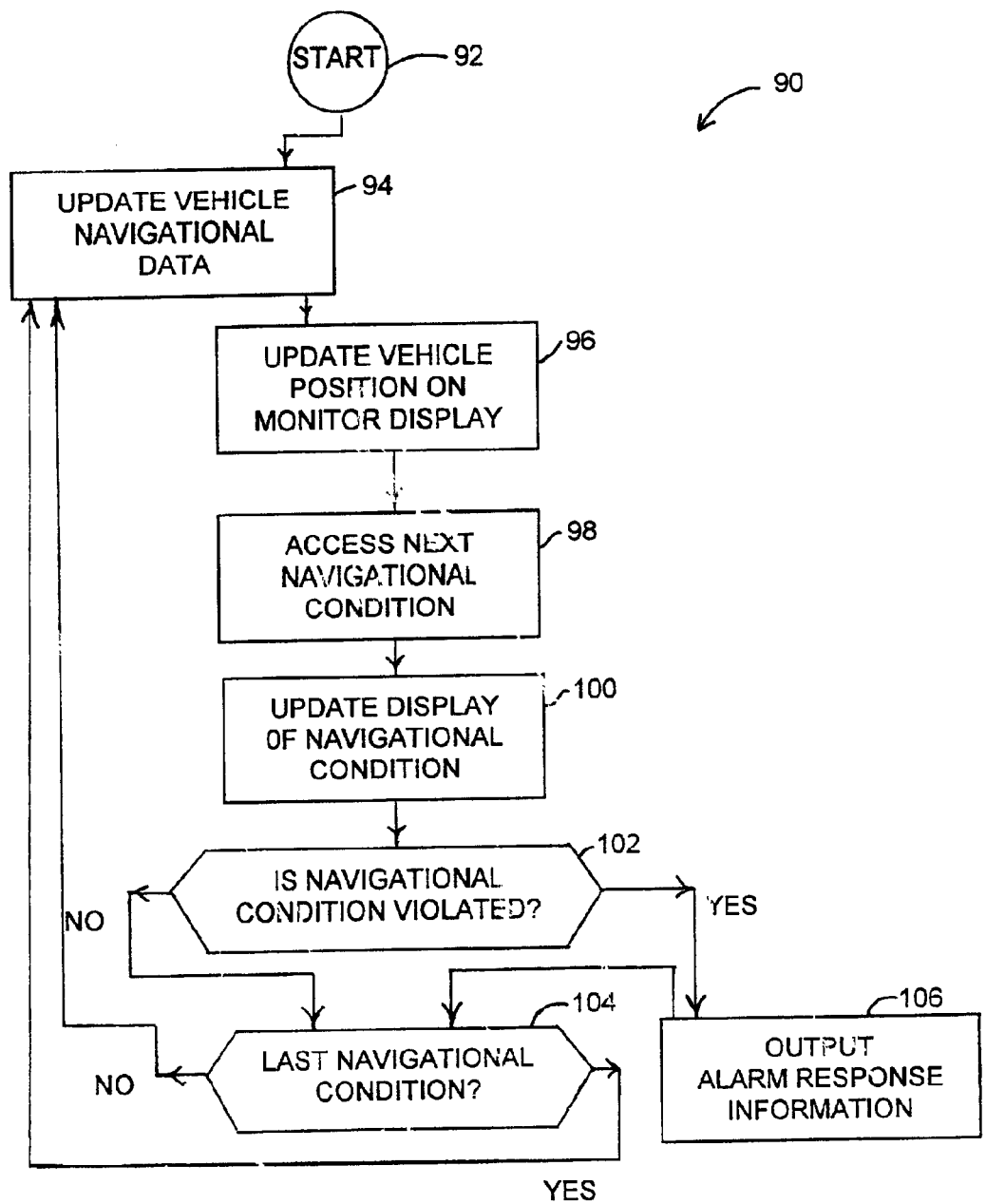
FIG. 5 is a flow chart of a computer program used in the data processing system shown in FIGS. 1 and 3.

A flow chart illustrating the operation of a vehicular safety program 90 that controls the operation of data processor 50 (FIG. 3) is illustrated in FIG. 5, to which reference is now made. Following any power on self testing or other initialization procedures, program 90 executes an update vehicle navigational data procedure 94 by obtaining navigational status information from navigational status determination system 12 over signal path 14. At a next update vehicle position monitor display procedure 96 data processor 50 updates a map display on monitor 52 (FIG. 3) to reflect the current position of the vehicle. Updating the display may involve not only moving a representation of the vehicle on the display map, but also changing the portion of the map that appears on the display as the vehicle moves.

Having obtained a new vehicle position, program 90 begins a process of determining whether or not the new vehicle position or other current vehicle navigational data violates any conditions for operation of the vehicle. At procedure 98 processor 50 accesses a next navigational condition from a list of navigational conditions stored in data store 54 of data processing system 16. Although the details are not shown in FIG. 5, data processor 50 begins with a first navigational condition following each vehicle navigational status update and accesses each of the navigational conditions on the list in a selected order.

A skilled programmer will recognize that several techniques may be used to reduce the burden on the data processor 50 as it processes the list of navigational conditions. For example, if an object is protected by multiple location dependent safety zones, each contained within one or more outer zones, only the outermost safety zone need be tested for a violation. The inner zones cannot be violated if the outermost zone is not violated. Alternatively, if the safety zones surrounding an object have an elevation limit or floor, further testing need not be performed once it is determined that the vehicle is above the elevation limit. If the vehicle is an airplane and a set of safety zones has an elevation limit of say 5000 feet for an object such as a nuclear reactor or 14,000 feet for a 12,000 foot high mountain peak (meaning that the airplane may fly over the safety zone as long as it is above the elevation limit), data processor 50 may test for a vehicle elevation above the elevation limit and then avoid further testing of safety zones associated with the object if the vehicle is above the elevation limit.

Further, the map of areas into which the vehicle might travel can be divided into sectors, with the data store of data processor 50 storing a list for each sector of the safety zones that extend into that sector. Data processor 50 may then reduce the number of safety zones that must be examined for possible safety violation by determining in which sector the vehicle is currently positioned and then determining if a safety violation exists with respect to only the safety zones listed for the current sector or perhaps the current sector plus the surrounding sectors.

After accessing a next navigational condition at procedure 98, data processor 50 updates the display of the navigational condition at procedure 100. Typically the navigational condition relates to a safety zone having a selected perimeter, such as a perimeter at a radius of 5 miles for an early warning safety zone surrounding a nuclear power plant. Both the power plant and a 5 mile circle surrounding the power plant are shown on the map display, requiring the position relative to the display borders to be updated as the portion of the map shown on the display changes to accommodate motion of the vehicle through the territory that is mapped.

At a next procedure 102, data processor compares the current navigational data with a current navigational condition to determine whether or not the navigational condition has been violated. At procedure 104 data processor 50 next tests to see if the last navigational condition in the list of navigational conditions that must be examined has been examined. If yes, program 90 returns to procedure 94 to again update the vehicle navigational data and begin testing for a violation of any navigational condition as indicated by the updated navigational data. If the last navigational condition has not been processed at procedure 104, program control branches to procedure 98 to access and test a next navigational condition.

If it is determined at procedure 102 that a navigational condition has been violated, program 90 branches to procedure 106 to generate appropriate alarm response information and output the information over signal path 18. The appropriate response depends on the violation that has occurred and the type of vehicle committing the violation. For example, if the vehicle has penetrated an early warning zone the display of the perimeter of the early warning zone on monitor 52 (FIG. 3) is caused to flash, information is transmitted over signal path 18 to command visual alarm 72 to activate, and information is sent over signal path 70 causing audio alarm 70 to activate. In a preferred example, visual alarm 72 is a red light that may or may not flash and audio alarm 70 is either a distinctive tone or an audible message. In a given application additional or alternative stimuli may be used, the goal being to insure that the vehicle operator is aware that an early warning zone has been violated.

If the vehicle has penetrated an extra-vehicular warning zone, which would typically have a boundary closer to a protected object than the early warning zone, data processor 50 sends alarm information over signal path 18 to secure communication system 74 commanding secure communication system 74 to notify at least one extra-vehicular communication and command center 78 of the extra-vehicular warning zone violation. Personnel at the extra-vehicular communication and command center 78 are thus alerted to contact the vehicle operator to ascertain why a violation has occurred and to take other appropriate action.

If the vehicle has penetrated an operator override safety zone, which would typically have a boundary closer to a protected object than the early warning zone or the extra-vehicular warning zone, data processor 50 sends alarm information over signal path 18 to vehicle operation override system 76 commanding vehicle operation override system 76 to take evasive action to prevent further penetration of the vehicle into the operator override safety zone. The evasive action can range from terminating engine power to the vehicle, braking the vehicle, forcing a turn away from the protected object to actively braking or otherwise decelerating the vehicle. In the case of an airplane the evasive action would most likely involve changing the vehicle course to avoid the object, either by turning the vehicle or by increasing the altitude of the airplane above an altitude ceiling associated with the protected zone or both. In one embodiment the airplane is forced to turn left for a certain number of seconds. The forced turn is repeated until the airplane is out of the vehicle operator override zone or is flying in a direction that will take the airplane out of the vehicle operator override zone. A more sophisticated exit path could of course be imposed which takes into account the speed, direction and location of the vehicle relative to the protected object.

After outputting alarm response information at procedure 106 program control branches to procedure 104 to determine whether or not a last navigational condition has been tested.

Figure 6:
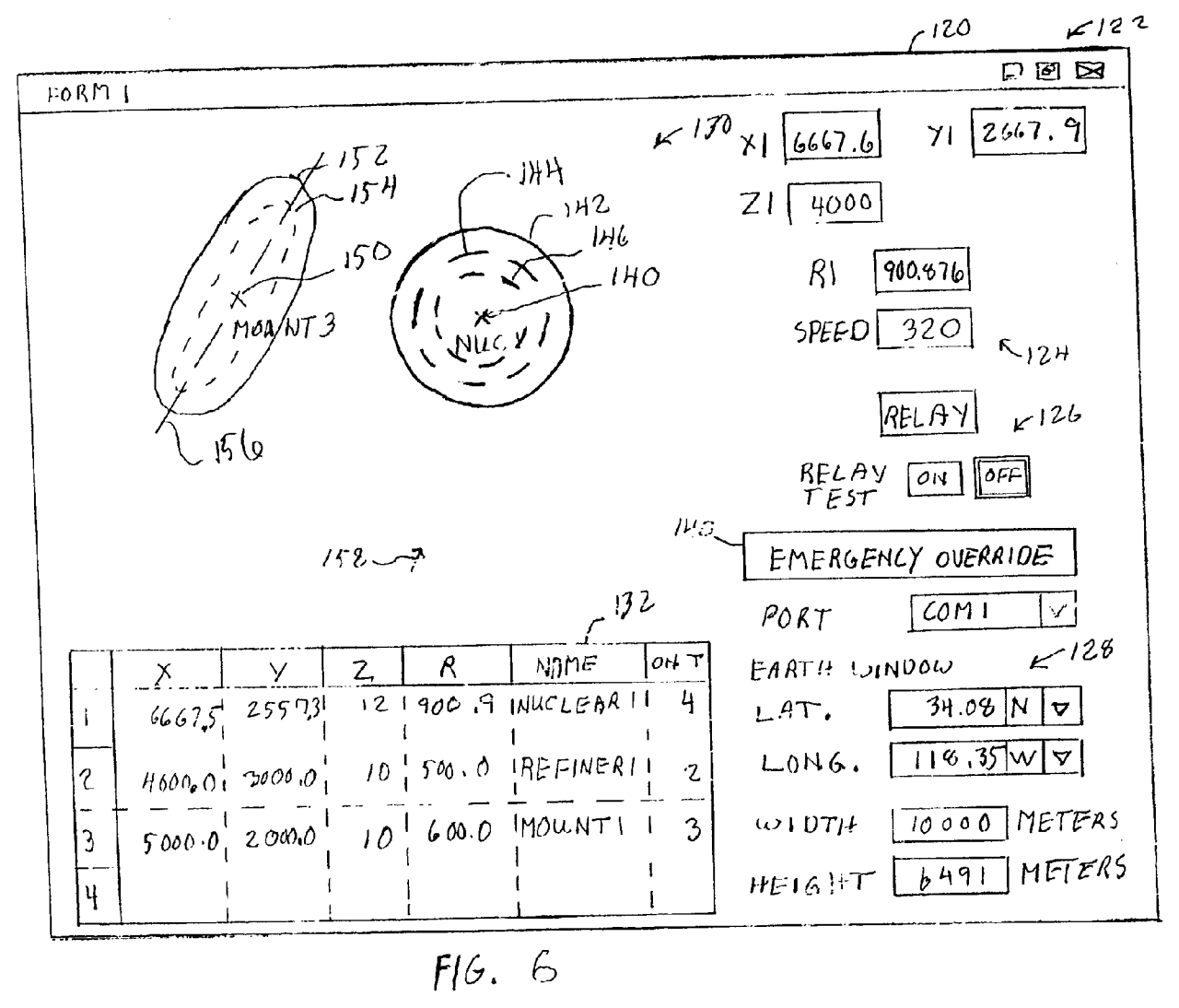

Referring now to FIG. 6, a monitor display 120 appearing on monitor 52 of data processing system 16 is displayed in a Windows frame having size control and program exit buttons 122, a vehicle navigational status display area 124, a program control display area 126, an earth window display area 128 indicating the portion of the map that is displayed in a map area 130 and a protection condition list 132. Although numbers are placed in the various display boxes by way of illustration, the numbers may or may not represent realistic numbers for an actual map display.

The vehicle navigational status display area 124 indicates the location of the vehicle with respect to the earth, which for the United States includes west longitude labeled X1, north latitude labeled Y1 and altitude above mean sea level in meters labeled Z1. A display of the radius of the nearest protective zone is labeled R1. A nearest protective zone is selected as the zone nearest to a line projected forward from the vehicle in the direction of vehicle motion. A display of the vehicle speed in miles per hour is labeled SPEED. Additional vehicle navigational status indications such as heading or attitude, turning status, pitch and roll could be displayed as well.

The program control display area provides some control features to the vehicle operator. A relay test feature includes on and off buttons and allows the operator to test the operator override feature of the safety system 10. As shown the test feature assumes an embodiment of the safety system 10 having a simple operator override function that is controlled by a relay, such as a forced left turn for a predetermined period of time, interruption of engine power or some other feature that can be switched on and off as by controlling a relay. Clicking on the "on" button with a pointing device (pushing the button) turns on or closes the relay to activate the override feature. For example, if the vehicle is a small plane with the operator override being a forced rudder movement to force a left turn, the override feature might be tested as part of the preflight testing by activating the "on" button. The test will automatically terminate after a selected number of seconds such as 5 seconds or the "off" button can be activated to terminate the test sooner. The "off" button is disabled when the vehicle is in violation of a safety condition that forces an operator override condition.

An emergency override button 140 can be actuated to produce a dialog box that allows the vehicle operator to enter a secret code that disables the operator override feature with an operator initiated emergency override. Optionally, the emergency override is enabled only after an encrypted emergency override enable signal is received by data processor 50 from an extra-vehicular communication and command center 78 through secure communication system 74 and signal path 18.

The Earth Window display area indicates the area of the map that is being displayed in map display area 130 and allows the vehicle operator to select the area of the map that is displayed. The display boxes labeled LAT. And LONG. indicate the latitude and longitude coordinates represented by the center of the map display area. These parameters can be changed under operator control to change the portion of the map that is displayed in the map display area 130. The display boxes labeled WIDTH and HEIGHT effectively indicate the scale of the map shown in the map display area by indicating the distance in meters between left and right (west and east) margins of the map display area in the WIDTH box and the distance in meters between the top and bottom (north and sought) margins of the map display area in the HEIGHT box.

In an alternative arrangement, the data processor controls the portion of the map that is displayed in map display area 130 in response to navigational information received from navigational status determination system 12. As the vehicle moves through the mapped area, the portion that is displayed is automatically updated so that the portion displayed always surrounds the vehicle location.

In the present example the map area 130 of display 120 shows a single protected object 140 that is labeled "NUC1" for nuclear power plant 1. The object 140 is surrounded by a spherically shaped exclusionary early warning zone 142, a spherically shaped exclusionary general warning zone 144 that is concentric with the early warning zone 142 and a spherically shaped exclusionary operator override zone 146 that is concentric with the early warning zone 142 and general warning zone 144. The object 140 is at the center of the safety zones 142, 144 and 146. One safety condition is associated with each of the zones 142, 144 and 146 in this example. The safety condition is that the vehicle should not enter the zone. The boundaries of the spherical protective zones 142, 144 and 146 appear as circles in the two dimensional representation of map area 130. In the event that it is determined by processor 50 that the early warning zone 142 has been penetrated by the vehicle, the circle representing the boundary of that zone is made to flash on the display monitor 52 as the warning to the operator. As previously discussed, additional visual and audible warnings may be given as well. In the event that the vehicle enters or penetrates the general warning zone 144 a warning is communicated through extravehicular communication system 74 to an extra-vehicular communication command center 78 to provide an extra-vehicular alert that a general warning safety zone has been violated. The violation of the operator override zone 146 produces a vehicle control override response, such as forcing a left turn in the case of an airplane or terminating engine power in the case of an automobile or boat.

The use of a spherical protection zone simplifies the determination of whether or not the vehicle has penetrated the protection or safety zone. In three dimensions the distance of the vehicle from the center of the protection or safety zone is readily calculated as, $$Rv = \text{Square Root}((Xv-X1)^2 + (Yv-Y1)^2 + (Zv-Z1)^2) \quad (1)$$

where Rv is the distance from the vehicle to the protected object 140, Xv, Yv and Zv are the latitudinal, longitudinal and height coordinates of the vehicle and X1, Y1 and Z1 are the latitudinal, longitudinal and height coordinates of the object 140. The distance of the vehicle from the boundary of a spherical protective or safety zone is simply the distance of the vehicle from the center of the zone Rv minus the radius of the zone. Protective zones can of course have other shapes such cylinders, cones and rectangles at the expense of requiring more processing to determine whether or not there has been penetration by the vehicle.

In some circumstances such as dealing with ground or water based vehicles or objects where an airplane is not allowed to fly over the object at any altitude, it may be desirable to perform distance calculations in two dimensions rather than three dimensions as in equation (1). In this case the distance of a vehicle from an object can be calculated as, $$Rv = \text{Square Root } ((Xv-X1)^2 + (Yv-Y1)^2) \quad (2)$$

The effective shape of the protective zone can be made to vary with the position and direction of the vehicle motion. For example, in the case of a mountain where the concern is more for protecting the vehicle than the object, the protective zones might have the shape of an elongated ellipse with the major axis oriented parallel to the direction of motion of the vehicle and the minor axis perpendicular to the direction of motion of the vehicle. If the vehicle were an airplane, it could fly fairly close beside the mountain without violating a protective condition, i.e., penetrating the protective zone. However, should the airplane turn toward the mountain, it would penetrate the protective zone and thus violate the condition that it not penetrate the protective zone much sooner than if the airplane were flying in a direction that is not towards the mountain. In the display area 130, the mountain is represented as object 150 labeled MOUNT3 surrounded by asymmetrical, elongated safety zones 152, 154 which extend along a direction of elongation on either side of a major axis 156. That is the zones 152, 154 have a greater length measured along the direction of the major axis 156 than width measured in a direction perpendicular to the major axis 156. The major axis is oriented in a direction parallel to the direction of motion of the vehicle when determining whether or not the vehicle has entered the safety zone. Consequently, a vehicle can pass relatively close by an object at the center of a safety zone without entering the safety zone. However, if a vehicle is on a collision course with an object at the center of a safety zone, the vehicle enters the safety zone and receives a warning relatively far from the mountain or other object at the center of the safety zone compared to the width of the safety zone along a minor axis that is perpendicular to the safety zone.

More particularly, the warning zones are implemented as an elliptical early warning zone 152 and an elliptical vehicle override zone 154. The ellipses 152, 154 are formed using a major axis 156 that is rotated as the travel direction of the vehicle changes so that the major axis 156 extends parallel to the direction of motion of the vehicle.

While other shapes may be used as well, an elongated safety zone, such as zones 152 and 154, is advantageously use to surround other vehicles such as other airplanes or ships. Each vehicle in an area such as a country or region regularly transmits its navigational status information such as position, speed and direction through communication system 74 to a center 78. The navigational status information for each vehicle is used to dynamically establish one or more moving exclusive safety zones about the vehicle which safety zones move with the vehicle. The safety zones are dynamically established by center 78 for each other vehicle in the vicinity of a subject vehicle and communicated to the subject vehicle. Successive safety zones for early warning to the subject vehicle operator, general warning and operator override evasive action are used to prevent an impending collision. The boundaries of such dynamically established safety zones are advantageously varied in response to the speeds of the vehicles involved. That is, a jet airplane traveling at 500 MPH is allocated a wider boundary than a small airplane traveling at 200 MPH which boundary is wider than the boundary of a ship traveling at 30 MPH.

Optionally, an arrow 158 indicates the position and direction of motion of the vehicle within map display 130.

The protection condition list 132 contains multiple rows, each row listing data associated with a protected object. In the list each protected object is protected by one or more exclusionary spherical protective zones centered on the object. The columns labeled X and Y display the longitudinal and latitudinal coordinates of the object while the column labeled Z displays the height of the object in meters. Column R indicates the radius of the outermost or early warning protective zone in meters while the name column provides a name for the protected object. The final column labeled "ON T" indicates the on time of the override procedure in seconds. That is, if the override procedure forces the vehicle to make a left turn, the left turn is imposed for 2–4 seconds as indicated in the various rows of table 132 at column "ON T". Thereafter, if the next navigational status update and condition test still indicates a violation of a safety zone, the left turn is imposed for another 2–4 seconds. Alternatively, a more sophisticated response is implemented that turns the vehicle to an exit path that extends away from the protected object and maintains that exit path until the violation of the vehicle operator override protective zone is cured.

In addition to the exclusive safety zones discussed above which exclude a vehicle from defined safety zones, inclusive safety zones or "tunnels" may be employed to assure the safety of a vehicle and protected objects. Confining a vehicle to a predetermined inclusive "safe" zone can achieve the same safety goal as excluding a vehicle from a predetermined safety zone defined about a protected object. The alarm response for violating in inclusive safety zone is essentially the same as that for violation of an exclusive safety zone except that any operator override of the control of the vehicle direction should attempt to turn the vehicle back inside the inclusive safety zone as opposed to turning the vehicle away from the exclusive safety zone.

The order of concentric safety zones is of course reversed for inclusive safety zones relative to exclusive safety zones. In the case of an inclusive safety zone the early warning zone is innermost followed by an extra-vehicular warning zone followed by an outermost operator override safety zone.

Conditions other than exclusion or inclusion may be applied to both exclusive and inclusive safety zones, but may be more easily applied to inclusive safety zones. For example, trucks and trailers are often barred from traveling on certain streets or highways that are not approved for such vehicles. It might be easier to define inclusive zones where the vehicle is allowed to go rather than define where it is not allowed to go. Different speed limits may be readily imposed as a safety condition on different parts of an inclusive safety zone. Entry of secret codes signifying inspection approvals may be required for passage through either exclusive or inclusive safety zones.

Similarly, in the case of a ship, the ship may be confined to certain shipping lanes and around a port or harbor a speed limit may be imposed as a safety condition or a ship may be allowed to enter an exclusive or inclusive safety zone in the vicinity of a harbor only if a harbor pilot has boarded the ship and entered a secret override code demonstrating the presence of the harbor pilot on board the ship.

In some cases it is easier to transmit defined safety zones from an extra-vehicular communication and command center 78 through secure communication system 74 and signal path 18 to data processor 50 than to pre-store all possible safety zones. For example, if a commercial airplane is ordered to fly a certain path or vector from Los Angeles to New York, an inclusive safety zone enclosing that path may be transmitted to the airplane. Thereafter, any significant deviation from the defined path produces an alarm response whether or not the deviation is detected by ground based radar.

Figure 7:
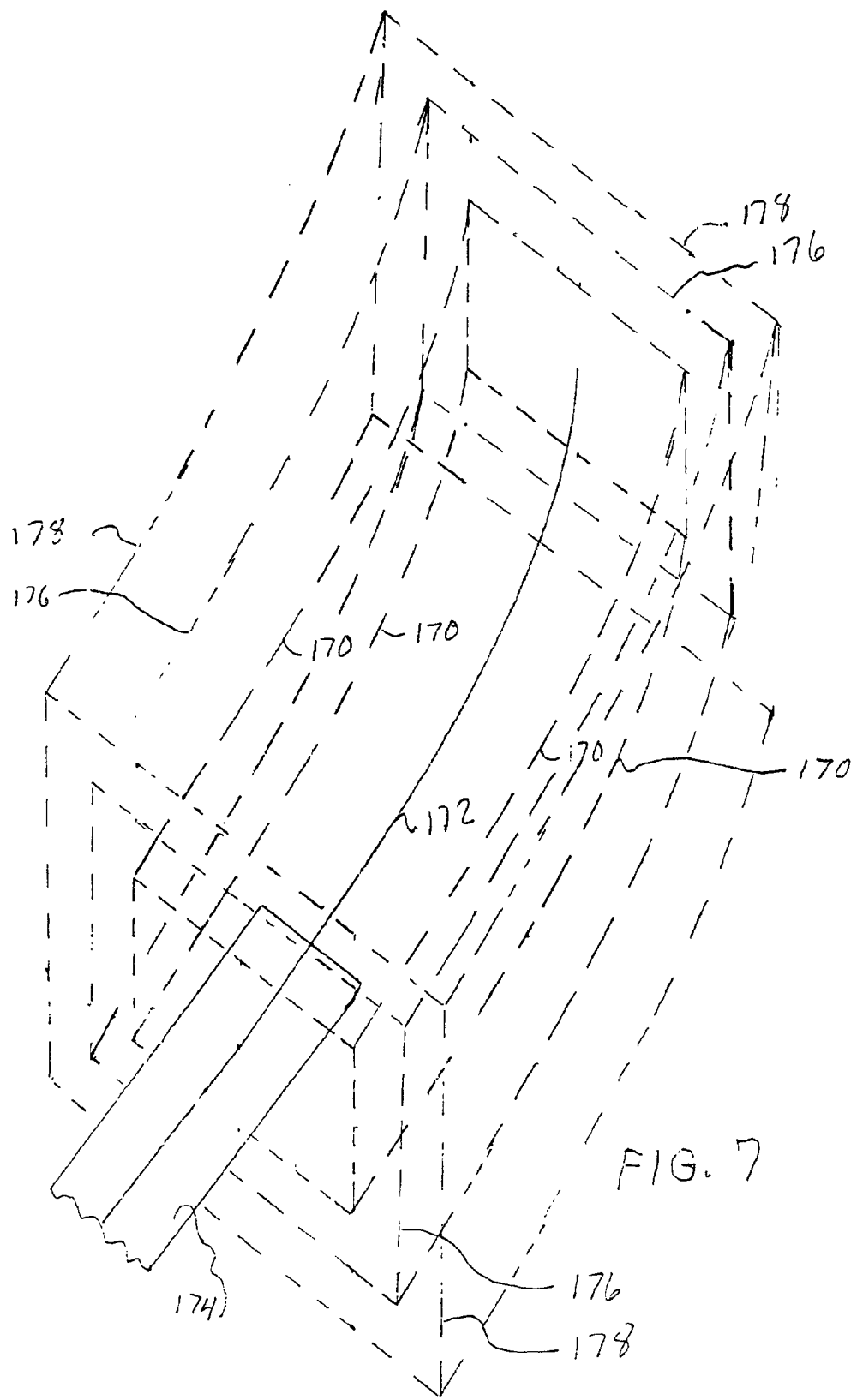
FIG. 7 is a simplified isometric illustration of an inclusive or "tunnel" safety zone used in the vehicular safety system shown in FIG. 1.

The use of an inclusive safety zone in the vicinity of an airport is particularly convenient. Airplanes must be allowed to land on airport runways, yet it is desirable to keep them away from airport terminals, storage facilities and other areas, at least until they have landed and decelerated below an acceptable speed limit. The desired goal is accomplished by defining an inclusive safety zone 170 for the runway approach path 172 as illustrated in FIG. 7, to which reference is now made. Safety zone 170 has an elongated boundary compared to a cross sectional dimension and extends in a longitudinal direction along approach path 172. Safety zone 170 has a rectangular shaped cross section (although alternative cross sectional shapes such a circular or elliptical could be used) and follows a path 172 intended for vehicle travel with the boundary of the safety zone 170 encompassing the intended travel path 172. An airplane is left free to follow runway approach path 172 to runway 174 so long as the airplane follows a normal approach path. However, if the airplane deviates significantly from the path or speed of a normal approach, an alarm response is generated by data processor 50.

An early warning alarm response zone 170 represents the innermost of what amounts to three concentric virtual tunnels as illustrated in FIG. 7. However, it will be appreciated that an inclusive extra-vehicular warning alarm response zone 176 is established outward of the early warning response zone 170 and that an operator override alarm response zone 178 is established outward from the extra-vehicular warning alarm response zone. For the safety of the airplane and passengers, the operator override alarm response is more sophisticated than a forced left turn and forces the airplane back toward the landing path 172. The height of the operator override safety zone 178 should be sufficient to allow an aborted landing without creating a violation of the operator override safety zone 178.

The boundaries of the inclusive safety zones 170, 176, 178 are established sufficient distance from landing path 172 that normal variations in following the landing path or in determining the position of the vehicle do not create a determination that a safety zone boundary has been violated. The purpose of an exclusive safety zone is to constrain a vehicle to remain on a selected path or roadway, not serve as an automatic pilot controlling the instantaneous operation of the vehicle. Boundaries of safety zones are defined about intended routes or paths with sufficient distance on either side of a widest allowable path that normal errors in determining the location of the vehicle should not produce an indication of a boundary violation. For example, establishing safety zones for landing path 172 with zone boundaries 100 feet or more on either side of a widest variation an airplane would experience following landing path 172 would not deprive a pilot of normal control of the airplane as it flies along the landing path 172 with the achievable accuracy using present day low cost technology. At the same time, a safety zone violation would quickly occur if the airplane were to deviate significantly from the normal landing path 172.

Further, while the early warning response safety zone 170 and the other concentric safety zones 172, 174 have a rectangular shape, and the safety zones 142, 144, 146 (FIG. 6) have a spherical shape, safety zones can have other shapes, such as cylindrical or elliptical where desired. Using computer graphics techniques for digitally representing surfaces of objects, translating and rotating objects calculating distances and other manipulations, safety zones can be defined with almost any arbitrary boundary shape desired where sufficient data processor capacity exists to test for safety zone violations.

As one alternative, a stationary inclusive safety zone may surround a vehicle to extent that the vehicle may not be significantly repositioned without violating the zone boundary, the primary condition associated with the zone being that the vehicle must not leave the zone by passing through a zone boundary. An alarm response communicates notification of the vehicle leaving the zone to law enforcement personnel. The zone is changed to permit movement of the vehicle only in response to a safety zone override code or other secure communication indicating that movement of the vehicle is acceptable. Such a safety zone may be used quarantine in a certain area until the vehicle or its load are approved by relevant law enforcement authorities, such inspection of safety equipment on the vehicle or inspection of the load. Such a safety zone may also serve to detect theft of the vehicle.

Another alternative is particularly applicable to a truck or trailer/cargo container where the path 172 is a highway, which need not follow a straight line. An inclusive safety zone follows the highway, but at an inspection or weighing station the safety zone leaves the highway and follows a road into the inspection or weighing station. If the vehicle stays on the highway and avoids the inspection or weighing station the vehicle violates the required condition of staying within the safety zone and alarm information indicating the violation is communicated to law enforcement personnel.

Figure 8:
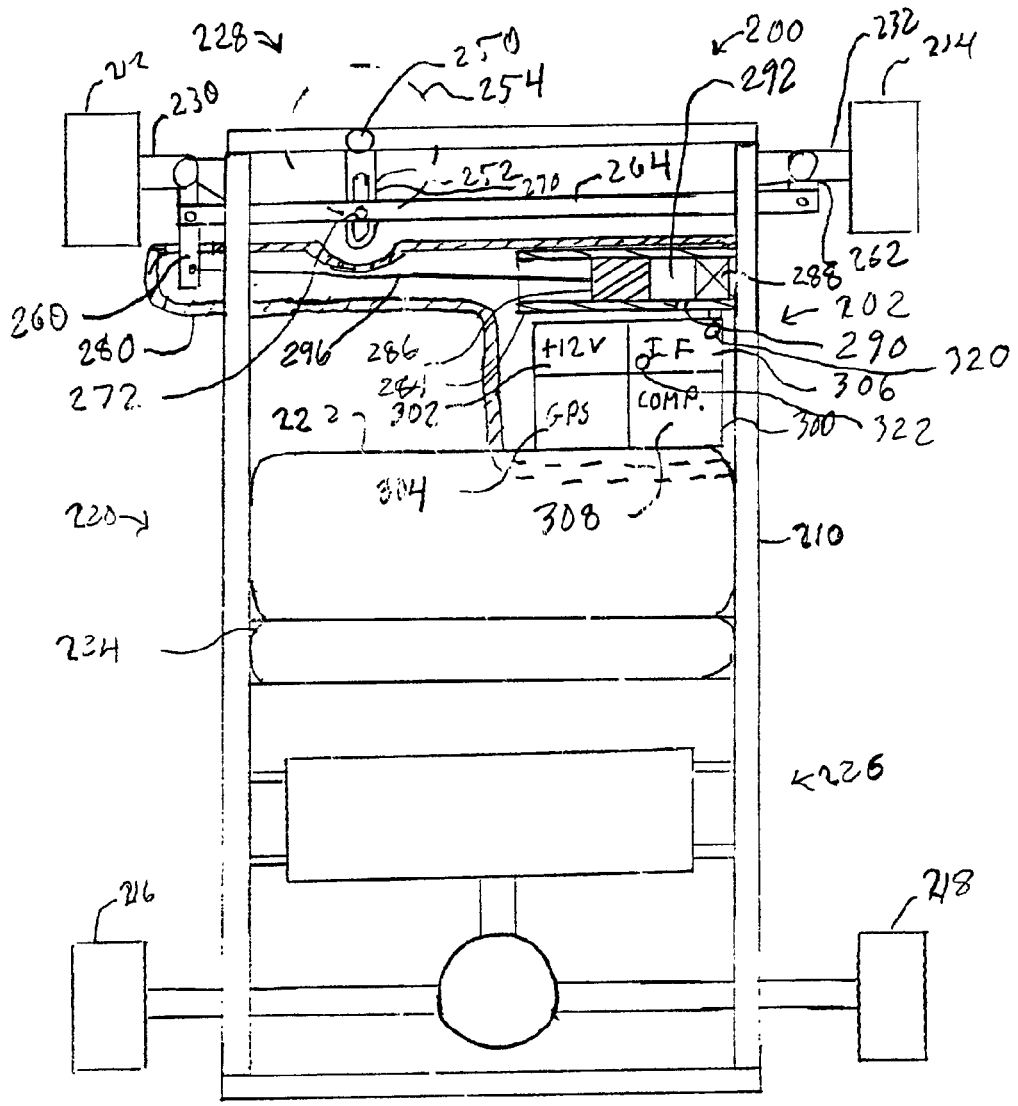
FIG. 8 is a simplified top view of a demonstration automobile employing a vehicular safety system in accordance with the invention.

Referring now to FIG. 8, a simplified representation of a demonstration automobile 200 employing a vehicular safety system 202 in accordance with the invention includes a frame 210 supporting front tires 212, 214, rear tires 216, 218, a seat 220 having a seat bench 222 and a seat back support 224, a drive train assembly 226 and a front end assembly 228. The demonstration automobile 200 is a simple go cart for the purpose of demonstrating the vehicular safety system 202. However, it will be recognized by those skilled in the art that the safety system 202 can be readily employed in connection with cars, trucks and trailers.

In the simplified representation of the steering assembly 228, front tires 212, 214 are supported by axles 230, 232 which are pivotally secured to frame 210 by supports 234, 236. Axles 230, 232 pivot about vertically extending pivot pins 238, 240. A steering column 250 is secured to frame 210 and rotates an arm 252 in response to rotation of a steering wheel 254. Steering arms 260, 262 are secured to axles 230, 232 and a tie rod 264 is connected to the steering arms 260, 262 at opposite ends thereof. A slot 270 in arm 252 and a pin 272 connect arm 252 to tie rod 264 such that rotation of steering wheel 254, steering column 250 and arm 252 produces lateral motion of tie rod 264. This lateral motion of tie rod 264 in turn turns the direction for front wheels 212, 214 to provide operator control over the direction of the automobile 200.

A tamper proof housing 280 receives a distal end of steering arm 260 and encloses a steering override assembly 282 including a cylinder 284, a piston 286 slideably and reciprocally disposed within the cylinder 284, and a motor driven vacuum pump assembly 288. A pin hole 290 allows air to slowly leak into a vacuum chamber 292 formed between piston 286 and the motor driven vacuum pump assembly 288. A flexible cable or string 296 extends within housing 280 between the distal end of steering arm 260 and piston 286.

When piston 286 is moved sufficiently far to the left, flexible cable 296 exerts no steering force and the vehicle operator is free to control the steering of vehicle 200 by turning steering wheel 254. However, when motor driven vacuum pump assembly 288 is activated to create a vacuum within vacuum chamber 292, piston 286 moves to the right, thereby forcing vehicle 200 to turn left. The mechanical advantage of steering override assembly 282 is selected to assure that actuation of assembly 282 overcomes any contrary steering force that might be asserted by an operator of vehicle 200.

The motor driven vacuum pump assembly 288 operates in response to an electronics assembly 300 that includes a 12 volt battery 302, a Global Positioning System (GPS) 304, which may be a system manufactured by Garmin, an interface 306 and a computer 308. Computer 308 includes a monitor display that extends through the tamper proof housing 280. Interface 306 receives alarm response command information from computer 308 and responds to those commands by actuating a relay 320 which in turn provides power to motor driven vacuum pump assembly 288 when relay 320 is actuated. A red indicator light 322, which is positioned to be seen by the vehicle operator is also illuminated any time the motor driven vacuum pump assembly 288 is actuated.

In operation, computer 308 receives navigational status information in the form of vehicle position data from GPS 304 and compares the position data to a list of safety zone conditions. In this example the condition is that a zone should not be entered by the vehicle. If a violation is detected, computer 308 sends operator override alarm command information to interface assembly 306 which responds to the alarm command information by actuating relay 320 and red indicator light 322. After a predetermined number of seconds, for example 4 seconds, computer 308 terminates the operator override alarm command information, thereby causing interface assemble 306 to terminate power to motor driven pump assembly 288 and indicator light 322. As air bleeds through pin hole 290 piston 286 becomes free to slide to the left and permit the vehicle operator to regain steering control over vehicle 200.

Figure 9:
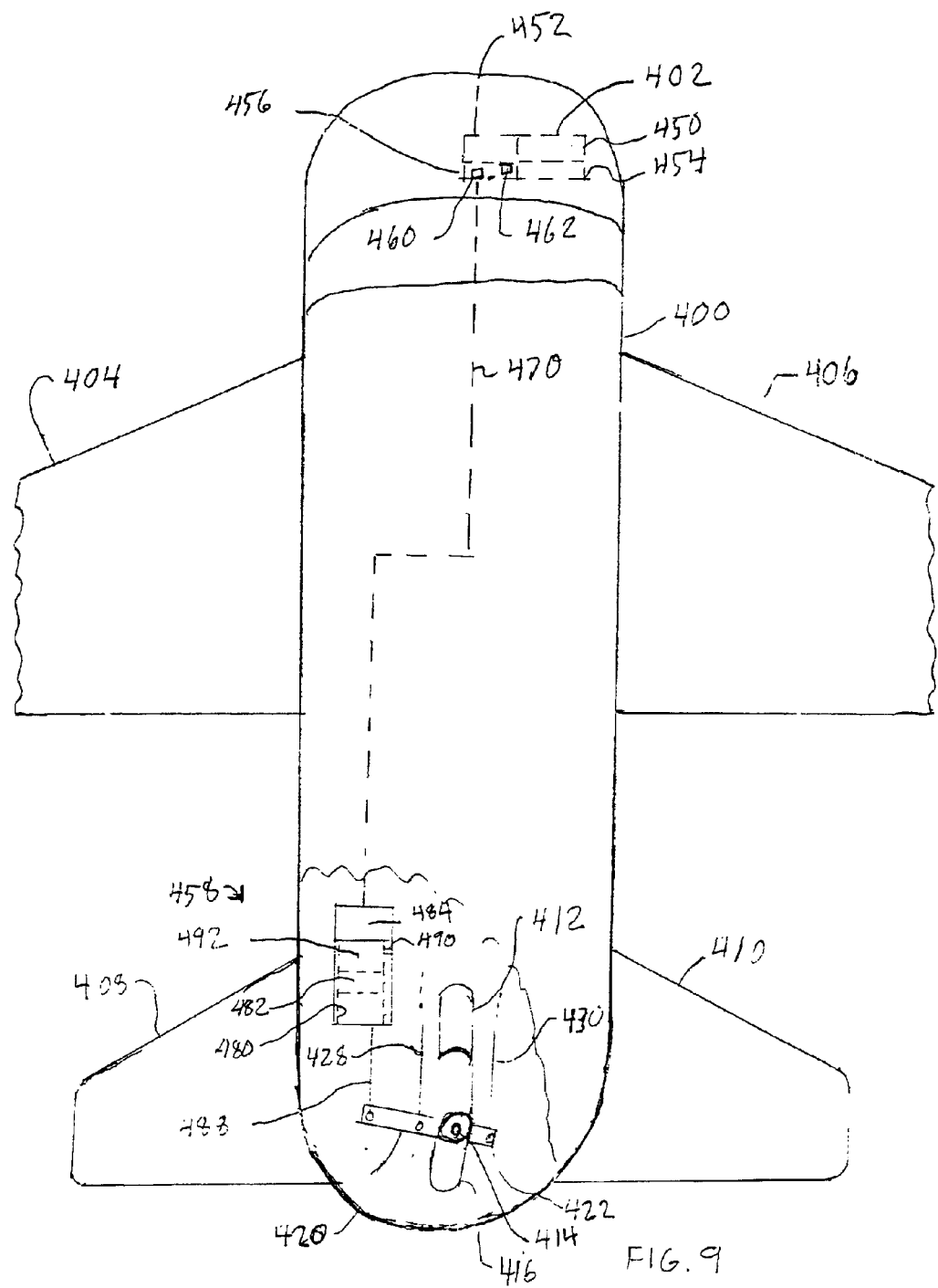
FIG. 9 is a simplified top view, partly broken away, of a demonstration airplane employing a vehicular safety system in accordance with the invention.

Referring now to FIG. 9, an airplane 400 employing a vehicular safety system 402 in accordance with the invention includes wings 404, 406, horizontal stabilizers 408, 410 and a vertical stabilizer 412. The vertical stabilizer is connected by a pin 414 to a rudder 416 which extends rearward from pin 414 and rotates about pin 414. Arms 420, 422 extend from rudder 416 on the left and right sides respectively and are affixed to rudder 416 in the vicinity of pin 414 to permit control over the rotation of rudder 416 and thus control over the steering of airplane 400. Steering cables 428, 430 connect between arms 420, 422 and the airplane steering control system (not shown) to enable an airplane operator, an autopilot or other direction control source to rotate rudder 416 and thus steer the airplane 400.

Vehicular safety system 302 includes a computer or data processor 450 receiving navigational status information from a navigational status system 452, a display monitor 454 which can be seen by the airplane 400 pilot and which provides a display that is updated in response to computer 450, and interface 456 and an actuator assembly 458. Computer 450 includes a data store storing a list of information defining one or more safety zones, a list of one or more safety conditions for each safety zone and data defining an alarm response for each violation of a safety condition. The simplified demonstration vehicular safety system 402 contains no secure communication system as illustrated in FIG. 4, but typically, a commercial embodiment of a vehicular safety system for an airplane would include a secure communication system.

Upon detecting a violation of an early warning safety condition, computer 450 provides notice of the violation to the pilot by causing a representation of an associated safety zone boundary on display monitor 454 to flash or by an audible warning. Upon detecting a violation of an operator override safety condition, computer 450 issues command information to interface 456 indicating the violation. Interface 456 responds by actuating a relay 460 and a red indicator light 462 for a selected number of seconds that is indicated by the command information communicated to interface 456 by computer 450. Upon actuation of relay 460 a signal is communicated over communication path 470 which causes the activation of actuator assembly 458.

In the present example actuator assembly 458 includes a cylinder 480 having a piston 482 reciprocally movable therein and a motor/vacuum pump assembly 484 coupled to create a vacuum in front of piston 482 to drive piston 482 forward when motor/vacuum pump assembly is activated in response to a signal received over communication path 470 from relay 460. Piston 482 is connected to a flexible cable 488 which extends between piston 42 and a distal end of arm 420 such that forward motion of piston 482 pulls arm 420 forward with a clockwise rotation to force a clockwise rotation on rudder 416. This clockwise rotation of rudder 426 in turn produces a left turn for airplane 400, there forcing airplane 400 to exit the violated safety zone. A pin hole 490 is provided through the side wall of cylinder 480 which extends into vacuum chamber 492. Consequently when motor/vacuum pump assembly 484 becomes deactivated, air leakage through pin hole 490 into vacuum chamber 492 restores a balanced pressure in vacuum chamber 492 which permits piston 482 to move rearward. This rearward motion removes tension from flexible cable 488, permitting normal steering control of rudder 416 by the pilot to be restored.

Those skilled in the art will recognize that a more sophisticated steering control system such a hydraulic control system may be used to control steering of airplane in a commercial embodiment of the vehicular control system 402. Alternatively, if the airplane is steered in response to a flight control computer such as an automatic pilot, safety system 402 can be connected to control steering of airplane 400 by communication steering command information to the flight control computer. In any event a steering command generated as part of an operator override response to a violation of a safety condition should have sufficient steering force to override any contrary pilot control.

Figure 10:
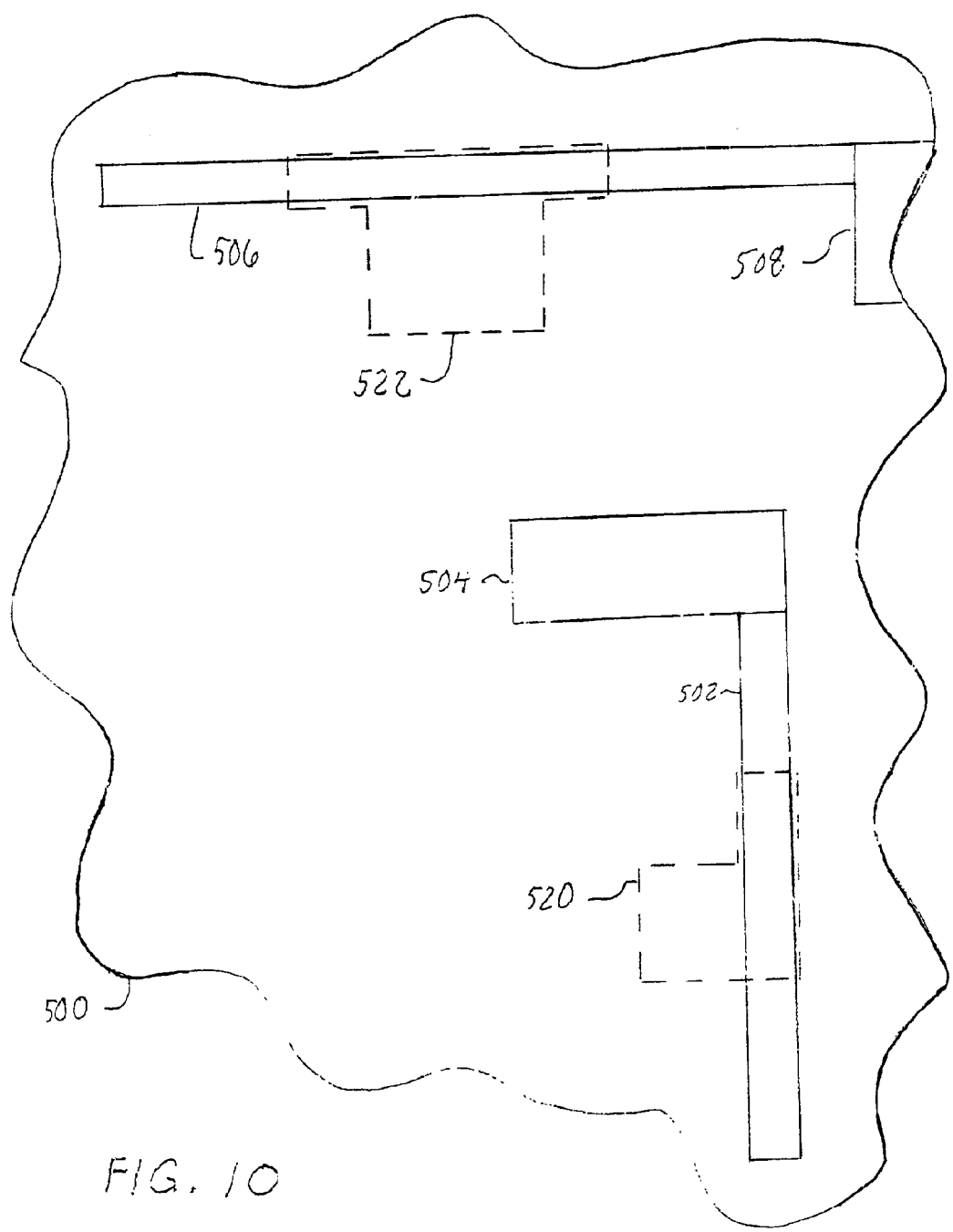
FIG. 10 is a top view of a fragment of a wide area safety zone used in a vehicular safety system in accordance with the invention.

Referring now to FIG. 10, a wide area safety zone 500 is defined to extend over a broad area such as North America or even the World with a fragment of such a zone being shown in FIG. 10 for purposes of illustration. The wide area safety zone 500 has very wide or even unlimited boundaries with exception safety zones 502, 504, 506, 508 being defined with in the wide area safety zone 500. The use of a wide area safety zone enables vehicle operating conditions to be defined over a wide area with exceptions easily made within the defined exception zones.

For example, in the case of a wide area safety zone 500 for an airplane, a floor of 15,000 feet might be imposed for an early warning wide area safety zone with the pilot receiving visual and audible warnings if the airplane altitude decreases below 15,000 feet within the unexcepted portion of the wide area zone 500. However, an exception zone 502 with a floor set at ground level is defined in the vicinity of a landing and take off path for a runway for an airport. A second exception zone 504 is defined a short distance from airport 520 to enable the airplane to enter a holding pattern before landing at airport 520. To facilitate use of the holding pattern exception safety zone 504 has an associated condition of maintaining an absolute minimum altitude of 500 or 1000 feet and may additionally have a dynamically assigned condition of maintaining a higher minimum altitude or floor when the airplane is assigned to a holding pattern in the exception zone 504 at a higher altitude. Exception zone 504 further has an associated condition of a speed limit slightly higher than a reasonable maximum speed for the airplane when the airplane is in a holding pattern in exception safety zone 504.

An airport 522 similarly has an exception safety zone 506 encompassing a landing and take off path and an exception safety zone 508 encompassing a holding pattern near airport 522. While wide area safety zone 500 has been described as an early warning safety zone, it could alternatively be implemented as a general warning zone with a floor somewhat lower than that of the early warning zone, such as 12,000 feet. The response to the airplane dropping below the 12,000 foot floor of the general warning zone is to transmit notice of the condition violation to a location outside the vehicle, for example to an aircraft controller or to law enforcement personnel.

As a further alternative the wide area safety zone might be an operator override side having a still lower floor, for example 9,000 feet with an associated operator override response of forcing the airplane to climb back above 9000 feet if the airplane is mechanically capable of doing so in the event of a violation of the 9000 foot floor condition. It will be appreciated by those skilled in the art that a wide area safety zone may have associated with it different or additional conditions that make the zone suitable for use with vehicles other than airplanes. One such condition might be a universal speed limit.

Figure 11:
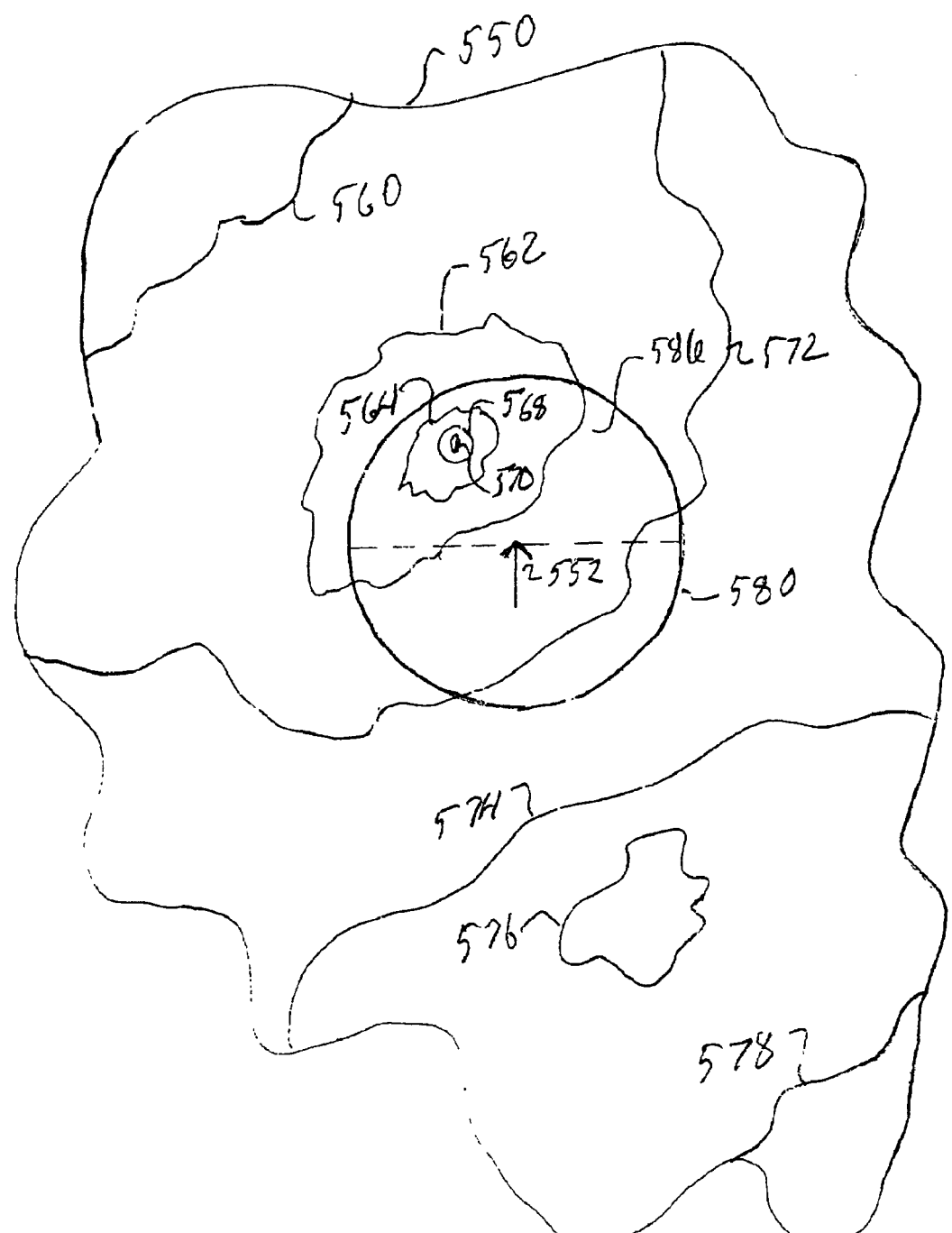
FIG. 11 is a top view of a fragment of a topographical map illustrating an adaptive safety zone in accordance with the invention.

Referring now to FIG. 11, a fragment 550 of a topographical map having terrain elevation information is illustrated with an airplane 552 superimposed on map fragment 550. The map has topological lines of constant altitude above sea level 560, 562, 564, 566, 568, 570, 572, 574, 576 and 578. Information defining the map is stored by data store 54 of data processing system 16 (FIG. 3). The map shows a hill top or mountain top within topographical line 570. In this case a two dimensional adaptive circular safety zone 580 is established about airplane 552 with airplane 552 at the center of the safety zone 580. The radius of safety zone 580 is preferably determined in response to the speed of the vehicle to provide a warning of, for example, at least 5 minutes for an early warning response to the vehicle operator. If the vehicle is an airplane traveling at 200 miles per hour, the radius would then be 16.7 miles.

Safety zone 580 has a navigational condition that the vehicle (airplane 552) not descend below a selected floor altitude. In this case the floor altitude is dynamically determined by data processor 50 by scanning map 550 within safety zone 580 and finding the highest point within safety zone 580. A selected value is then added to the altitude of this highest point. For example, for an early warning safety zone a differential altitude of 5000 feet might be used. If the hilltop 570 has an elevation of 1200 feet, then the floor for safety zone 580 would be temporarily set to 6200 feet. As hill 570 passes out of the safety zone 580 or as a higher hill enters safety zone 580 the selected floor altitude is changed in response to the changing landscape. For a general warning safety zone the altitude differential is set somewhat lower, for example at 4000 feet, making the floor 5200 feet above sea level. A still lower differential, for example 3000 feet, is set for an operator override safety zone in which airplane 552 is forced to take an evasive response such as forcing the airplane 552 to climb, irrespective of operator control to the contrary.

In an alternative arrangement for a small plane the differential is set at 1000 feet for an early warning zone. This is sufficient to warn the pilot so that the pilot can take evasive action before hitting the highest object in the vicinity.

It will be appreciated that either the safety zone 580 or its floor must be suspended in response to a code or password entered from the airplane 552 pilot or in response to a code or command received from a communication center 78.

Persons skilled in the art will recognize that the shape of safety zone 580 need not be circular. For example, by looking only ahead of vehicle 552 the safety zone becomes a semi-circle 586. Alternatively, safety zone 580 is advantageously implemented with an elongated or elliptical shape (or the forward looking half of such a shape) as illustrated by safety zones 152 and 154 in FIG. 6.

As used in this specification, the term "navigational status information" means any information representing, indicating or defining the location, orientation or motion of a vehicle, including but not limited information relating to longitude, latitude, altitude, direction of motion, speed, acceleration or deceleration, or vehicle orientation (attitude, pitch and rollo). The location or motion may be defined with respect to any coordinate system or point of reference, it being recognized that navigational information defined in one coordinate system may be transferred to a different coordinate system or point of reference.

As used in this specification, the word "vehicle" should be broadly interpreted to mean any device or contrivance for carrying persons or objects. An automobile is a vehicle that normally travels by making frictional engagement with the ground. An airplane is a vehicle that can travel without making engagement with the ground or with water and includes commercial and private airplanes, helicopters, vertical takeoff and landing aircraft, and spacecraft. A boat or a ship is a vehicle that can travel on or beneath the water.

As used in this specification, the word "or" is intended to mean an inclusive "or" covering either alternative or both alternatives unless the context explicitly indicates otherwise.

In the following claims, it is intended that a claim element be interpreted as a means plus function or step plus function claim element that is to be interpreted to cover the corresponding structure, material or acts described in the specification and equivalents thereof as specified by 35 USC § 112, paragraph 6, when and only when, the claim element recites the express language "means for" or "step" for performing a function.

While there has been shown and described a vehicular safety system and method for the purpose of enabling a person of ordinary skill in the art to make and use the invention, it will be appreciated that the invention is not limited thereto. For example, both inclusive and exclusive safety zones may be defined in many different ways, and nearly limitless list of conditions may be associated with each safety zone. However, the disclosure of a specific feature does not mean that the feature is required for all implementations of the invention or that an alternative feature or circuit (whether or not specifically disclosed) could not be used in place of the disclosed feature or circuit. The embodiment or embodiments described herein are intended to exemplify, but not limit the claimed invention. The subject matter which applicant regards as the invention is defined by the attached claims. Accordingly, any modifications variations or equivalent arrangements within the scope of the attached claims should be considered to be within the scope of the invention.

What is claimed is:

1. A vehicular safety system comprising:
    a navigational status determination system generating navigational status information representing a navigational status of a vehicle, the navigational status information including position of the vehicle;
    a data processing system positioned on the vehicle, the data processing system storing information defining an inclusive safety zone having a boundary that surrounds the vehicle, the data processing system storing at least one navigational condition for operation of the vehicle that is responsive to the position of the vehicle relative to the boundary of the safety zone and generating alarm information in response to the navigational status information when the navigational status information indicates that the at least one navigational condition has been violated, the navigational condition including a condition that the vehicle not cross the boundary of the safety zone; and an alarm response system generating a protective response in response to the alarm response information.

2. A vehicular safety system according to claim 1 wherein the vehicle is an airplane.

3. A vehicular safety system according to claim 1 wherein the vehicle is a truck.

4. A vehicular safety system according to claim 1 wherein the vehicle is a trailer.

5. A vehicular safety system according to claim 1 wherein the generated navigational status information includes information representing the velocity of the vehicle.

6. A vehicular safety system according to claim 1 wherein the generated navigational status information includes information representing the acceleration and speed of the vehicle.

7. A vehicular safety system according to claim 1 wherein the navigational status determination system includes a Global Positioning System (GPS) receiver and wherein the generated navigational status information includes information representing the position, speed and direction of the vehicle.

8. A vehicular safety system according to claim 1 wherein the alarm response system generates a protective response upon the vehicle crossing the boundary of the safety zone of overriding an aspect of operator control of the vehicle to prevent the vehicle from leaving the inclusive safety zone.

9. A vehicular safety system according to claim 1 wherein the alarm response system generates a protective response upon the vehicle leaving the inclusive safety zone of blocking fuel supply to the engine of the vehicle to prevent the vehicle from traveling farther away from the inclusive safety zone.

10. A vehicular safety system according to claim 1 wherein the alarm response system generates a protective response upon the vehicle leaving the inclusive safety zone which alarm response includes providing an audible warning to the vehicle operator that the vehicle has left the inclusive safety zone.

11. A vehicular safety system according to claim 1 wherein the navigational condition is that the vehicle should not leave the inclusive safety zone and wherein the alarm response system generates a protective response upon the vehicle leaving the inclusive safety zone which protective response includes providing an audible warning to the vehicle operator that the vehicle has left the inclusive safety zone and notifying law enforcement authorities that the vehicle has left the inclusive safety zone.

12. A vehicular safety system according to claim 1 wherein the alarm response system generates a protective response upon the vehicle exceeding a speed limit of providing a warning to a communication center outside the vehicle that the vehicle has exceeded a speed limit.

13. A vehicular safety system according to claim 1 wherein the navigational condition is that the vehicle should not leave a selected inclusive safety zone and wherein the alarm response system generates a protective response upon the vehicle leaving the inclusive safety zone of providing a warning to a communication center outside the vehicle that the vehicle has left an inclusive safety zone.

14. A vehicular safety system according to claim 1 wherein the vehicle is an airplane and wherein the alarm response system generates a protective response upon the vehicle crossing the boundary of the safety zone of overriding operator steering control of the vehicle by forcing the vehicle to turn left.

15. A vehicular safety system according to claim 1 wherein the alarm response system generates a protective response upon the vehicle leaving the inclusive safety zone of overriding an aspect of operator control over steering of the vehicle by forcing the vehicle to turn left.

16. A vehicular safety system according to claim 1 wherein the vehicle is an airplane, and wherein the alarm response system generates a protective response upon the vehicle crossing the boundary of the inclusive safety zone of overriding operator steering control of the vehicle by forcing the vehicle to turn for a predetermined period of time.

17. A vehicular safety system according to claim 1 wherein the navigational condition is that the vehicle should not leave the inclusive safety zone and wherein the alarm response system generates a protective response upon the vehicle leaving the inclusive safety zone of overriding an aspect of operator control over steering of the vehicle by forcing the vehicle to turn for a predetermined period of time.

18. A vehicular safety system according to claim 1 wherein the data processing system stores information defining an exclusive safety zone having a boundary, wherein the at least one navigational condition includes a condition that the vehicle should not enter an exclusive safety zone, wherein the alarm response system generates a protective response upon the vehicle entering the exclusive safety zone of providing a warning to a communication center outside the vehicle that the vehicle has entered an exclusive safety zone and wherein the data processing system includes a display providing to the vehicle operator a display of a map of a local area in the vicinity of the vehicle, the map including an indication of the location a boundary of the exclusive safety zone.

19. A vehicular safety system according to claim 1 wherein the navigational condition is that the vehicle should not leave a selected inclusive safety zone, wherein the alarm response system generates a protective response upon the vehicle leaving the inclusive safety zone of providing a warning to a communication center outside the vehicle that the vehicle has left an inclusive safety zone and wherein the data processing system includes a display providing to the vehicle operator a display of a map of a local area in the vicinity of the vehicle, the map including an indication of the location of a boundary of the inclusive safety zone.

20. A vehicular safety system according to claim 1 wherein the safety zone is cylindrical in shape.

21. A vehicular safety system according to claim 1 wherein the safety zone is rectangular in shape.

22. A vehicular safety system according to claim 1 wherein the vehicle is a ship.

23. A vehicular safety system according to claim 1 wherein, in addition to the inclusive safety zone, the data processing system stores information defining a first plurality of safety zones, each surrounding a selected first location and a second plurality of safety zones, each surrounding a selected second location, the first and second pluralities of safety zones each including:

(a) an early warning safety zone having a navigational condition that the vehicle should not enter the zone and an associated protective response of notifying the vehicle operator of a violation of the navigational condition, (b) a general warning safety zone having a navigational condition that the vehicle should not enter the zone and an associated protective response of providing notice to a location external to the vehicle of a violation of the navigational condition, and (c) an operator override safety zone having a navigational condition that the vehicle should not enter the safety zone and an associated protective response of overriding operator control of the vehicle to limit further penetration of the vehicle into the operator override safety zone.

24. A vehicular safety system according to claim 1 wherein the safety zone is a stationary inclusive safety zone that surrounds the vehicle, prohibiting repositioning of the vehicle without violating the safety zone boundary.

25. A vehicular safety system according to claim 1 wherein the vehicle is an airplane and wherein the data processing system stores information defining a plurality of inclusive safety zones, each surrounding the vehicle, the plurality of zones each including:

(a) an early warning zone having a navigational condition that the vehicle should not leave the zone and an associated protective response of notifying the vehicle operator of a violation of the navigational condition, (b) a general warning zone having a navigational condition that the vehicle should not leave the zone and an associated protective response of providing notice to a location external to the vehicle of a violation of the navigational condition, and (c) an operator override zone having a navigational condition that the vehicle should not leave the zone and an associated protective response of overriding operator control of the altitude of the airplane by forcing the airplane to turn for a selected period of time, the selected period of time being in the range of 2 to 10 seconds, inclusive.

26. A vehicular safety system according to claim 1 wherein the data processor includes an operator input device that receives a password and receives a command for terminating the active status of a previously entered password and wherein a stored navigational condition requires a valid password be entered and have active status.

27. A vehicular safety system according to claim 1 wherein the data processor includes an operator input device that receives a password and receives a command for terminating the active status of a previously entered password and wherein a stored navigational condition requires a valid password be entered and have active status and wherein the alarm response system prevents operator control of a parked vehicle unless a password has been entered by an operator and the password has active status.

28. A vehicular safety system according to claim 1 wherein the data processor includes an operator input device that receives a password and receives a command for terminating the active status of a previously entered password and wherein the at least one navigational condition stored by the data processing system includes the condition that the vehicle may not leave a defined zone unless a valid password has been entered into the input device and has active status.

29. A vehicular safety system according to claim 1 wherein the vehicle is an airplane and the boundary of the defined safety zone has a location that varies in response to the speed of the airplane.

30. A vehicular safety system according to claim 1 wherein the data processing system further stores information defining an exclusive safety zone and stores at least one navigational condition that is associated with the exclusive safety zone, and wherein the stored at least one navigational condition associated with the exclusive safety zone includes a condition that the vehicle not come within a selected distance of a defined location of an object, the distance of the vehicle from the object being determined in three dimensions as follows:

$$Rv = \text{Square Root } ((Xv-X1)^2 + (Yv-Y1)^2 + (Zv-Z1)^2)$$

where Rv is the distance from the object location to the vehicle, Xv is the longitudinal coordinate of the vehicle, X1 is the longitudinal coordinate of the object location, Yv is the latitudinal coordinate of the vehicle, Y1 is the latitudinal coordinate of the object location, Zv is the altitude coordinate of the vehicle, and Z1 is the altitude coordinate of the object location.

31. A vehicular safety system according to claim 1 wherein the data processing system further stores information defining an exclusive safety zone and stores at least one navigational condition that is associated with the exclusive safety zone, and wherein the stored at least one navigational condition associated with the exclusive safety zone includes a condition that the vehicle not come within a selected distance of a defined location of an object, the distance of the vehicle from the object being determined in two dimensions as follows:

$$Rv = \text{Square Root } ((Xv-X1)^2 + (Yv-Y1)^2)$$

where Rv is the distance from the object location to the vehicle, Xv is the longitudinal coordinate of the vehicle, X1 is the longitudinal coordinate of the object location, Yv is the latitudinal coordinate of the vehicle and Y1 is the latitudinal coordinate of the object location.

32. A vehicular safety system according to claim 1 wherein the navigational status determination system includes a GPS receiver, a compass, an altimeter and a radar system and includes a Kallman filter processing data generated by the GPS receiver, compass, altimeter and radar system to generate the navigational status information.

33. A vehicular safety system according to claim 1 wherein the alarm response system includes a communication system receiving other vehicle navigation information representing position, speed and direction of motion of another vehicle and wherein the data processing system stores information defining an exclusive safety zone that surrounds the other vehicle and is defined in response to the received other vehicle navigation information, the exclusive safety zone having a condition that the vehicle should not enter the exclusive safety zone.

34. A vehicular safety system according to claim 1 wherein the data processina system stores information defining a plurality of inclusive safety zones, each surrounding the vehicle, the plurality of inclusive safety zones each including:

(a) an early warning zone having a navigational condition that the vehicle should not leave the zone and an associated protective response of notifying the vehicle operator of a violation of the navigational condition, (b) a general warning zone having a navigational condition that the vehicle should not leave the zone and an associated protective response of providing notice to a location external to the vehicle of a violation of the navigational condition, and (c) an operator override zone having a navigational condition that the vehicle should not leave the zone and an associated protective response of overriding operator control of the altitude of the airplane by forcing the airplane to turn for a predetermined period of time.

35. A vehicular safety system according to claim 34 wherein the generated navigational status information includes information indicating the position of the vehicle in a coordinate system, wherein the data processing system includes a display displaying to the vehicle operator a map of a local area in the vicinity of the vehicle which map indicates the location any navigational conditions in the local area, the display further displaying an indication of a violation of a navigational condition upon the occurrence of such a violation.

36. A vehicular safety system according to claim 34 wherein the vehicle is an airplane and wherein the generated navigational status information includes information indicating the position of the vehicle in a coordinate system, wherein the data processing system includes a display displaying to the vehicle operator a map of a local area in the vicinity of the vehicle which map indicates the location any navigational conditions in the local area, the display further displaying an indication of a violation of a navigational condition upon the occurrence of such a violation.

37. A vehicular safety system comprising:
  a navigational status determination system generating navigational status information representing a navigational status of the vehicle;
  a data processing system storing a list of one or more safety zones, each safety zone having a boundary, each safety zone having associated therewith at least one condition that restricts operation of the vehicle within the safety zone, the data processing system determining in response to the navigational status information whether or not a listed safety zone is occupied by the vehicle and, if it is determined that a listed safety zone is occupied by the vehicle, whether or not a condition of the occupied safety zone restricting operation of the vehicle has been violated by the vehicle, the data processing system generating alarm response information indicating an alarm response in response to a determination that a condition of an occupied safety zone has been violated;
  an alarm response system producing a protective action in response to the alarm information generated by the data processing system.

38. A vehicular safety system according to claim 37 wherein the generated navigational status information includes information indicating the position of the vehicle in a coordinate system, wherein the data processing system includes a display displaying to the vehicle operator a map of a local area in the vicinity of the vehicle which map indicates the location any navigational conditions in the local area, the display further displaying an indication of a violation of a navigational condition upon the occurrence of such a violation.

39. A vehicular safety system according to claim 37 wherein the vehicle is an airplane and wherein the generated navigational status information includes information indicating the position of the vehicle in a coordinate system, wherein the data processing system includes a display displaying to the vehicle operator a map of a local area in the vicinity of the vehicle which map indicates the location any navigational conditions in the local area, the display further displaying an indication of a violation of a navigational condition upon the occurrence of such a violation.

40. A vehicular safety system according to claim 37 wherein the vehicle is an automobile and wherein the generated navigational status information includes information indicating the position of the vehicle in a coordinate system, wherein the data processing system includes a display displaying to the vehicle operator a map of a local area in the vicinity of the vehicle which map indicates the location any navigational conditions in the local area, the display further displaying an indication of a violation of a navigational condition upon the occurrence of such a violation.

41. A vehicular safety system according to claim 37 wherein the vehicle is a ship and wherein the generated navigational status information includes information indicating the position of the vehicle in a coordinate system, wherein the data processing system includes a display displaying to the vehicle operator a map of a local area in the vicinity of the vehicle which map indicates the location any navigational conditions in the local area, the display further displaying an indication of a violation of a navigational condition upon the occurrence of such a violation.

42. A vehicular safety system comprising:
  a navigational status determination system generating navigational status information representing a navigational status of the vehicle, the navigational status determination system including a Global Positioning System (GPS) receiver and generating navigational status information representing position, speed and direction of motion of the vehicle;
  a data processing system, the data processing system including a data store storing a list of one or more safety zones and safety zone definition information for each safety zone on the list, each safety zone having associated therewith at least one condition restricting operation of the vehicle, the data processing system further including a data processor mounted on the vehicle and receiving navigational status information from the navigational status determination system and determining in response to the received navigational status information and in response to the stored safety zone definition information whether or not a listed safety zone is occupied by the vehicle and if it is determined that a listed safety zone is occupied by the vehicle, whether or not a condition of the occupied safety zone restricting operation of the vehicle has been violated by the vehicle, the data processor generating alarm response information indicating an alarm response associated with the violated condition in response to a determination that a condition of an occupied safety zone has been violated if a determination is made that a condition associated with a safety zone is violated, the list of one or more safety zones including:
  (a) a first safety zone having a boundary extending around an object, the boundary being an asymmetrical boundary having an axis of elongation that extends parallel to the direction of motion of the vehicle, the first safety zone being an early warning exclusive safety zone having a navigational condition that the vehicle should not enter the first safety zone which navigational condition includes an alarm response including a notification to the vehicle operator that the vehicle has entered an exclusive safety zone,
  (b) a second safety zone having a boundary located within the boundary of the first safety zone and extending around the object, the second safety zone being a general warning exclusive safety zone having a navigational condition that the vehicle should not enter the second safety zone which navigational condition includes an alarm response including a notification to personnel outside the vehicle that the vehicle has entered an exclusive general warning safety zone, and (c) a third safety zone having a boundary located within the boundary of the second safety zone and extending around the object, the third safety zone being an operator override safety zone having a navigational condition that the vehicle should not enter the third safety zone which navigational condition includes an alarm response including an operator override response in which the alarm response overrides an aspect of operator control of the vehicle to limit further motion into the third safety zone and toward the object by the vehicle; and an alarm response system receiving alarm response information from the data processor and executing a protective action alarm response indicated by the received alarm response information in response to the alarm information generated by the data processing system, the alarm response system including:

(a) an audio alarm providing an audio alarm to the vehicle operator in response to audio alarm response information, (b) a visual alarm providing a visual alarm to the vehicle operator in response to visual alarm response information, (c) a vehicle operator override system overriding the vehicle operator with respect to a vehicle control function in response to operator override alarm response information, (d) a secure communication system communicating information indicating a condition violation in response to communication alarm response information, and (e) an extra-vehicular communication and command center located outside the vehicle and receiving information indicating a condition violation communicated by the secure communication system.

43. A vehicular safety system according to claim 42 further comprising a display providing the a vehicle operator an indication of a location of at least one of the safety zones relative to the vehicle.

44. A vehicular safety system according to claim 42 wherein the vehicle is a trailer.

45. A vehicular safety system according to claim 42 wherein the vehicle is a ship.

46. A vehicular safety system comprising:

a navigational status determination system located on an airplane and generating navigational status information representing a navigational status of the airplane, the generated navigational status information including information representing a position of the airplane within a coordinate system;

a data processing system mounted on the vehicle, the data processing system including a data store located on the vehicle and storing information defining a wide area safety zone having a boundary that encompasses at least two airport runways at two different airports, the data store storing a plurality of navigational conditions that are associated with the wide area safety zone, the navigational conditions including a requirement that the airplane maintain a selected altitude, including an exception to the altitude requirement in exception zones in the vicinity of the airports and including a speed limit in exceptions zones in the vicinity of the airports the data processing system receiving navigational status information from the navigational status determination system and determining in response to the received navigational status information and in response to the stored safety zone information whether or not the wide area safety zone is occupied by the vehicle and, if the data processing system determines that wide area safety zone is occupied by the vehicle, the data processing system determining whether or not a navigational condition associated with the occupied safety zone has been violated, the data processing system generating alarm response information indicating an alarm response associated with the violated condition if a determination is made that a condition associated with the occupied safety zone has been violated; and an alarm response system producing a protective action in response to the alarm response information generated by the data processing system.

47. A vehicular safety system comprising:

a navigational status determination system, the navigational status determination system generating navigational status information including information representing a position of the vehicle within a coordinate system;

a data store located on the vehicle storing information defining a plurality of safety zones including a an operator override exclusive safety zone having a boundary extending around another vehicle and moving in resoonse to motion of the other vehicle to maintain the boundary extending around the other vehicle, each safety zone having at least one navigational condition associated therewith with at least one safety zone having a navigational condition that the vehicle should not enter the safety zone, and each navigational condition having at least one alarm response associated therewith, the operator override exclusive safety zone having a navigational condition that the vehicle should not enter the safety zone which navigational condition includes an alarm response including an operator override response in which the alarm response overrides an aspect of operator control of the vehicle to limit further motion of the vehicle into the safety zone and toward the object, a data processor determining in response to the generated navigational status information and in response to the stored safety zone definition information whether or not a condition associated with a safety zone entered by the vehicle has been violated, the data processor generating alarm response information indicating an alarm response associated with the violated condition if a determination is made that a condition associated with a safety zone is violated; and an alarm response system receiving alarm response information from the data processor and executing an alarm response indicated by the received alarm response information.

48. A vehicular safety system according to claim 1 wherein the vehicle is a truck and wherein the alarm response includes an operator override response in which the alarm response overrides an aspect of operator control of the truck to limit further motion of the truck out of the safety zone when generated alarm information indicates that the truck has left the safety zone the override of operator control of the truck including changing a direction of motion of the truck.

49. A vehicular safety system according to claim 47 wherein the vehicle is an airplane and the other vehicle is another airplane and wherein the alarm response includes an operator override response in which the alarm response overrides an aspect of operator control of the airplane to limit further motion of the airplane into the safety zone and toward the other airplane.

50. A vehicular safety system according to claim 49, wherein the operator override alarm response includes forcing the airplane to make a left turn.

51. A vehicular safety system according to claim 37, wherein the vehicle is an airplane, wherein the defined safety zones include an operator override safety zone having an operator override alarm response and having a ceiling associated therewith such that the airplane does not enter the operator override response safety zone when flying above the ceiling and wherein the operator override alarm response includes causing the airplane to climb to a higher altitude above the ceiling.

52. A vehicular safety system according to claim 47, wherein the plurality of safety zones defined by information stored in the data store include:
   (a) a first safety zone having a boundary extending around an object, the first safety zone being an early warning exclusive safety zone having a navigational condition that the vehicle should not enter the first safety zone, the data processor generating audio and visual alarm resoonse information soon the vehicle entering the first safety zone, and
   (b) a second safety zone having a boundary located within the boundary of the first safety zone and extending around the object, the second safety zone being a general warning exclusive safety zone having a navigational condition that the vehicle should not enter the second safety zone, the data processor generating audio and visual alarm response information and communication alarm response information upon the vehicle entering the second safety zone;
   and wherein the alarm response system includes:
   (a) an audio alarm providing an audio alarm to the vehicle operator in response to audio alarm response information generated by the data processor,
   (b) a visual alarm providing a visual alarm to the vehicle operator in response to visual alarm response information generated by the data processor,
   (c) a secure communication system communicating information indicating a condition violation in response to communication alarm response information generated by the data processor, and
   (d) an extra-vehicular communication and command center located outside the vehicle and receiving information indicating a condition violation communicated by the secure communication system.

53. A vehicular safety system according to claim 52 further comprising a display providing a vehicle operator an indication of a location of at least one of the safety zones relative to the vehicle.

54. A vehicular safety system according to claim 47, wherein the plurality of safety zones defined by information stored in the data store include:
   (a) a first safety zone having a boundary encompassing an object, the first safety zone being an early warning exclusive safety zone having a navigational condition that the vehicle should not enter the first safety zone, which navigational condition has an associated alarm response including a notification to the vehicle operator that the vehicle has entered an exclusive safety zone, and
   (b) a second safety zone having a boundary located within the boundary of the first safety zone and encompassing the object, the second safety zone being a general warning exclusive safety zone having a navigational condition that the vehicle should not enter the second safety zone which navigational condition which navigational condition is associated with an alarm response including an alarm response of notification to personnel outside the vehicle that the vehicle has entered a general warning exclusive safety zone.

55. A vehicular safety system comprising:
   a navigational status determination system, the navigational status determination system generating navigational status information including information representing a position of the vehicle within a coordinate system;
   a data store located on the vehicle the data store storing information defining a plurality of safety zones, each safety zone having at least one navigational condition associated therewith and each navigational condition having at least one alarm response associated therewith, the defined safety zones including a safety zone having a boundary extending around an object, the safety zone being an operator override safety zone having a navigational condition that the vehicle should not enter the safety zone which navigational condition includes an alarm response including an operator override response in which the alarm response overrides an aspect of operator control of the vehicle to limit further motion of the vehicle into the safety zone and toward the object, the plurality of safety zones defined by information stored in the data store including:
   (a) a first safety zone having an elongated boundary of rectangular cross section, the first safety zone being an inclusive safety zone defining a travel path for the vehicle, the first safety zone being an early warning inclusive safety zone having a first navigational condition requiring the vehicle to remain within the first safety zone with an alarm response that the vehicle operator be notified of a violation and a second navigational condition requiring the vehicle to travel at a speed below a selected speed limit with an alarm response of notification of the vehicle operator of a violation,
   (b) a second safety zone having an elongated boundary of rectangular cross section, the second safety zone being an inclusive safety zone defining a travel path for the vehicle, the second safety zone having a first navigational condition requiring the vehicle to remain within the second safety zone with an alarm response of notifying an extra-vehicular communication and command center of a violation and a second navigational condition requiring the vehicle to travel at a speed below a selected speed limit with an alarm response of notifying an extra-vehicular communication and command center of a violation,
   (c) a third safety zone having an elongated boundary of rectangular cross section, the third safety zone being an inclusive safety zone defining a zone within which the vehicle must travel, the third safety zone having a navigational condition requiring the vehicle to remain within the third safety zone with an alarm response to a violation of the condition of overriding operator control of the vehicle to prevent the vehicle from traveling outside the third safety zone;
   a data processor mounted on the vehicle and receiving navigational status information from the navigational status determination system, the data processor determining in response to the received navigational status information and in response to the stored safety zone definition information whether or not a condition associated with a safety zone entered by the vehicle has been violated, the data processor generating alarm response information indicating an alarm response associated with a violated condition if a determination is made that a condition associated with a safety zone has been violated; and an alarm response system receiving alarm response information from the data processor and executing an alarm response indicated by the received alarm response information, the alarm response system including:
(a) an audio alarm providing an audio alarm to the vehicle operator in response to audio alarm response information,
(b) a visual alarm providing a visual alarm to the vehicle operator in response to visual alarm response information,
(c) a vehicle operator override system overriding the vehicle operator with respect to a vehicle control function in response to operator override alarm response information,
(d) a secure communication system communicating information indicating a condition violation in response to communication alarm response information, and
(e) an extra-vehicular communication and command center located outside the vehicle and receiving information indicating a condition violation communicated by the secure communication system.

56. A vehicular safety system according to claim 47 wherein the defined safety zones include:
(a) a first safety zone, the first safety zone being an early warning inclusive safety zone having a navigational condition requiring the vehicle to remain within the first safety zone with an alarm response that the vehicle operator be notified of a violation,
(b) a second safety zone, the second safety zone being a general warning inclusive safety zone having a navigational condition requiring the vehicle to remain within the second safety zone with an alarm response of notifying an extra-vehicular communication and command center of a violation, and
(c) a third safety zone, the third safety zone being an inclusive operator override safety zone having a navigational condition requiring the vehicle to remain within the third safety zone with an alarm response to a violation of the condition of overriding operator control of the vehicle to prevent the vehicle from traveling outside the third safety zone.

57. A vehicular safety system according to claim 56 wherein the vehicle is an automobile and further comprising a display providing a vehicle operator an indication of a location of at least one of the safety zones relative to the vehicle.

58. A vehicular safety system according to claim 47,
wherein the vehicle is an airplane;
wherein the defined safety zones include:
(a) a first safety zone, the first safety zone being an early warning inclusive safety zone having a navigational condition requiring the airplane to remain within the first safety zone with an alarm response that the vehicle operator be notified of a violation,
(b) a second safety zone, the second safety zone being a general warning inclusive safety zone having a navigational condition requiring the airplane to remain within the second safety zone with an alarm response of notifying an extra-vehicular communication and command center of a violation,
(c) a third safety zone, the third safety zone being an inclusive operator override safety zone having a navigational condition requiring the airplane to remain within the third safety zone with an alarm, response to a violation of the condition of overriding operator control of the airplane to prevent the vehicle from traveling outside the third safety zone; and
wherein the data processor is mounted on the airplane.

59. A vehicular safety system according to claim 47,
wherein the navigational status determination system is located on a truck; and
wherein the defined plurality of safety zones include:
(a) a first safety zone, the first safety zone being an early warning inclusive safety zone having a navigational condition requiring the vehicle to remain within the first safety zone with an alarm response that the vehicle operator be notified of a violation,
(b) a second safety zone, the second safety zone being a general warning inclusive safety zone having a navigational condition requiring the vehicle to remain within the second safety zone with an alarm response of notifying an extra-vehicular communication and command center of a violation,
(c) a third safety zone, the third safety zone being an inclusive operator override safety zone having a navigational condition requiring the vehicle to remain within the third safety zone with an alarm response to a violation of the condition of overriding operator control of the vehicle to prevent the vehicle from traveling outside the third safety zone; and
wherein the data processor is mounted on the truck and determines in response to the received navigational status information and in response to the stored safety zone definition information whether or not a condition associated with a first, second or third safety zone has been violated, the data processor generating alarm response information indicating an alarm response if a determination is made that a condition associated with a first, second or third safety zone has been violated.

60. A vehicular safety system according to claim 47,
wherein the navigational status determination system is mounted on a trailer;
wherein the data store is located on the trailer and the defined safety zones include:
(a) a first safety zone, the first safety zone being an early warning inclusive safety zone having a navigational condition requiring the vehicle to remain within the first safety zone with an alarm response that the vehicle operator be notified of a violation,
(b) a second safety zone, the second safety zone being a general warning inclusive safety zone having a navigational condition requiring the vehicle to remain within the second safety zone with an alarm response of notifying an extra-vehicular communication and command center of a violation, and
(c) a third safety zone, the third safety zone being an inclusive operator override safety zone having a navigational condition requiring the vehicle to remain within the third safety zone with an alarm response to a violation of the condition of overriding operator control of the vehicle to prevent the vehicle from traveling outside the third safety zone; and wherein the data processor is mounted on the trailer.

61. A vehicular safety system according to claim 47, wherein the navigational status determination system is located on the vehicle and wherein the data store is mounted on the vehicle and the stored information defining a plurality of safety zones includes information defining an inclusive operator override safety zone having a navigational condition requiring the vehicle to remain within the safety zone with an alarm response to a violation of the condition of overriding operator control of the vehicle to prevent the vehicle from traveling outside the safety zone.

62. A vehicular safety system according to claim 61 further comprising a display providing the a vehicle operator an indication of a location of at least one of the safety zones relative to the vehicle.

63. A vehicular safety system according to claim 47 wherein the data store is located on the vehicle and the plurality of defined safety zones includes:
  (a) a first safety zone, the first safety zone being an early warning inclusive safety zone having a navigational condition requiring the vehicle to remain within the first safety zone with an alarm response that the vehicle operator be notified of a violation, and
  (b) a second safety zone, the second safety zone being a general warning inclusive safety zone having a navigational condition requiring the vehicle to remain within the second safety zone with an alarm response of notifying an extra-vehicular communication center of a violation.

64. A vehicular safety system comprising:
a navigational status determination system, the navigational status determination system generating navigational status information including information representing position, speed and direction of motion of the vehicle within a coordinate system;
a data store located on the vehicle storing information defining a plurality of safety zones, each safety zone having at least one navigational condition associated therewith and each navigational condition having at least one alarm response associated therewith, the defined safety zones including a safety zone having a boundary extending around an object, the safety zone being an operator override safety zone having a navigational condition that the vehicle should not enter the safety zone which navigational condition includes an alarm response including an operator override response in which the alarm response overrides an aspect of operator control of the vehicle to limit further motion of the vehicle into the safety zone and toward the object, the defined plurality of safety zones including:
  (a) a first safety zone having an elliptically shaped boundary, the ellipse being defined along a major axis that remains parallel to a direction of motion of the vehicle, the first safety zone having a condition that the vehicle not enter the first safety zone and an alarm response to a violation of the condition of notifying the vehicle operator of the violation, and
  (b) a second safety zone having an elliptically shaped boundary, the ellipse being defined along a major axis that remains parallel to a direction of motion of the vehicle, the second safety zone having a condition that the vehicle not enter the second safety zone and an alarm response to a violation of the condition of overriding operator control of the vehicle to prevent further penetration of the vehicle into the second safety zone;
a data processor mounted on the vehicle, the data processor determining in response to the generated navigational status information and in response to the stored safety zone definition information whether or not a condition associated with a safety zone entered by the vehicle has been violated, the data processor generating alarm response information indicating an alarm response associated with the violated condition if a determination is made that a condition associated with a safety zone is violated and the data processor generating display information in response to the received navigational status information and in response to the stored safety zone definition information, the generated display information indicating a map covering an area in the vicinity of the vehicle and indicating a location of the vehicle and a location of the first and second safety zones;
an alarm response system receiving alarm response information from the data processor and executing an alarm response indicated by the received alarm response information; and
a monitor display positioned in the vehicle in view of the vehicle operator, the monitor display providing a display of the map in the vicinity of the vehicle including an indication of a location of the vehicle and a location of the first and second safety zones; and
wherein the alarm response system includes:
  (a) an audio alarm providing an audio alarm to the vehicle operator in response to audio alarm response information,
  (b) a visual alarm providing a visual alarm to the vehicle operator in response to visual alarm response information, and
  (c) a vehicle operator override system overriding the vehicle operator with respect to a vehicle control function in response to operator override alarm response information.

65. A vehicular safety system comprising:
a navigational status determination system, the navigational status determination system generating navigational status information including information representing a position of the vehicle within a coordinate system and the navigational status information generated by the navigational status determination system further including information representing speed and direction of motion of the vehicle;
a data store located on the vehicle storing information defining a plurality of safety zones, each safety zone having at least one navigational condition associated therewith and each navigational condition having at least one alarm response associated therewith, the defined safety zones including a safety zone having a boundary extending around an object, the safety zone being an operator override safety zone having a navigational condition that the vehicle should not enter the safety zone which navigational condition includes an alarm response including an operator override response in which the alarm response overrides an aspect of operator control of the vehicle to limit further motion of the vehicle into the safety zone and toward the object, the defined plurality of safety zones including:
  (a) a first safety zone having a boundary that is relatively elongated along a major axis, the first safety zone having a condition that the vehicle not enter the first safety zone and an alarm response to a violation of the condition of notifying the vehicle operator of the violation, and
  (b) a second safety zone having a boundary that is relatively elongated along a major axis, the second safety zone having a condition that the vehicle not enter the second safety zone and an alarm response to a violation of the condition of overriding operator control of the vehicle to prevent further penetration of the vehicle into the second safety zone;

a data processor on the vehicle the data processor determining in response to the generated navigational status information and in response to the stored safety zone definition information whether or not a condition associated with a safety zone entered by the vehicle has been violated, the data processor generating alarm response information indicating an alarm response associated with the violated condition if a determination is made that a condition associated with a safety zone is violated, the data processor receiving navigational status information from the navigational status determination system, the data processor rotating the direction of the major axes of the first and second safety zones to a direction parallel to a direction of motion of the vehicle and determining whether or not a condition associated with a safety zone is being violated in response to the received navigational status information and in response to the stored safety zone definition information, the data processor generating display information in response to the received navigational status information and in response to the stored safety zone definition information, the generated display information indicating a map covering an area in the vicinity of the vehicle and indicating a location of the vehicle and a location of the first and second safety zones;

an alarm response system receiving alarm response information from the data processor and executing an alarm response indicated by the received alarm response information; and a monitor display positioned in the vehicle in view of the vehicle operator, the monitor display providing a display of the map in the vicinity of the vehicle including an indication of a location of the vehicle and a location of the first and second safety zones.

66. A vehicular safety system comprising:

a navigational status determination system located on the vehicle, the navigational status determination system generating navigational status information including information representing a position of the vehicle within a coordinate system and information representing speed and direction of motion of the vehicle;

a data store located on the vehicle storing information defining a plurality of safety zones, each safety zone having at least one navigational condition associated therewith and each navigational condition having at least one alarm response associated therewith, the defined safety zones including a safety zone having a boundary extending around an object, the safety zone being an operator override safety zone having a navigational condition that the vehicle should not enter the safety zone which navigational condition includes an alarm response including an operator override response in which the alarm response overrides an aspect of operator control of the vehicle to limit further motion of the vehicle into the safety zone and toward the object, wherein the data store is located on the vehicle, the defined plurality of safety zones including a safety zone having a boundary that is relatively elongated along a major axis, the safety zone having a condition that the vehicle not enter the safety zone and an alarm response to a violation of the condition of notifying the vehicle operator of the violation;

a data processor determining in response to the generated navigational status information and in response to the stored safety zone definition information whether or not a condition associated with a safety zone entered by the vehicle has been violated, the data processor generating alarm response information indicating an alarm response associated with the violated condition if a determination is made that a condition associated with a safety zone is violated; and an alarm response system receiving alarm response information from the data processor and executing an alarm response indicated by the received alarm response information, the alarm response system including an indicator indicating to the vehicle operator that the vehicle has entered the safety zone in response to the alarm response information generated by the data processor.

67. A vehicular safety system comprising:

a navigational status determination system located on the vehicle, the navigational status determination system generating navigational status information including information representing a position of the vehicle within a coordinate system and information representing speed and direction of motion of the vehicle;

a data store located on the vehicle storing information defining a plurality of safety zones, each safety zone having at least one navigational condition associated therewith and each navigational condition having at least one alarm response associated therewith, the defined safety zones including a safety zone having a boundary extending around an object, the safety zone being an operator override safety zone having a navigational condition that the vehicle should not enter the safety zone which navigational condition includes an alarm response including an operator override response in which the alarm response overrides an aspect of operator control of the vehicle to limit further motion of the vehicle into the safety zone and toward the object, the data store storing information defining a safety zone having an asymmetrically shaped boundary that is relatively elongated along a major axis, the safety zone having a condition that the vehicle not enter the safety zone and an alarm response to a violation of the condition of overriding operator control of the vehicle to prevent further penetration of the safety zone by the vehicle;

a data processor mounted on the vehicle, the data processor determining in response to the generated navigational status information and in response to the stored safety zone definition information whether or not a condition associated with a safety zone entered by the vehicle has been violated, the data processor generating alarm response information indicating an alarm response associated with the violated condition if a determination is made that a condition associated with a safety zone is violated, the data processor rotating the direction of the major axis of the safety zone in response to a direction of motion of the vehicle and determining whether or not the vehicle has entered the safety zone in response to the received navigational status information and in response to the stored safety zone definition information, the data processor generating alarm response information indicating an alarm response if a determination is made that the vehicle has entered the safety zone; and an alarm response system receiving alarm response information from the data processor and overriding operator control of the vehicle to prevent further penetration of the safety zone by the vehicle in response to the alarm response information generated by the data processor.

68. A vehicular safety system comprising:

a navigational status determination system located on a vehicle, the navigational status determination system including a Global Positioning System (GPS) receiver and generating navigational status information representing position, speed and direction of motion of the vehicle;

a data store located on the vehicle storing information defining a plurality of safety zones, each safety zone having at least one navigational condition associated therewith and each navigational condition having at least one alarm response associated therewith, the defined safety zones including:

(a) a first safety zone having a spherically shaped boundary having a selected radius and a center near a protected object, the first safety zone being an early warning exclusive safety zone having a navigational condition that the vehicle should not enter the first safety zone which navigational condition includes an alarm response including a notification to the vehicle operator that the vehicle has entered an exclusive safety zone, (b) a second safety zone having a spherically shaped boundary that is concentrically located within the boundary of the first safety zone and has a radius less than the radius of the first safety zone, the second safety zone being a general warning exclusive safety zone having a navigational condition that the vehicle should not enter the second safety zone which navigational condition includes an alarm response including a notification to personnel outside the vehicle that the vehicle has entered an exclusive general warning safety zone, (c) a third safety zone having a spherically shaped boundary that is concentrically located within the boundary of the second safety zone and has a radius less than the radius of the second safety zone, the third safety zone being an operator override safety zone having a navigational condition that the vehicle should not enter the third safety zone which navigational condition includes an alarm response including an operator override response in which the alarm response overrides an aspect of operator control of the vehicle to limit further motion into the third safety zone by the vehicle, (d) a fourth safety zone having an elongated boundary of rectangular cross section, the fourth safety zone being an inclusive safety zone defining a travel path for the vehicle, the defined travel path having boundaries sufficiently distant from a normal path of the vehicle that the defined travel path does not interfere with normal operation of the vehicle, the fourth safety zone being an early warning safety zone having a first navigational condition requiring the vehicle to remain within the fourth safety zone with an alarm response that the vehicle operator be notified of a violation and a second navigational condition requiring the vehicle to travel at a speed below a selected speed limit with an alarm response of notification of the vehicle operator of a violation, (e) a fifth safety zone having an elongated boundary of rectangular cross section, the fifth safety zone being an inclusive safety zone defining a travel path for the vehicle, the defined travel path having boundaries sufficiently distant from a normal path of the vehicle that the defined travel path does not interfere with normal operation of the vehicle, the fifth safety zone having a first navigational condition requiring the vehicle to remain within the fifth safety zone with an alarm response of notifying an extra-vehicular communication and command center of a violation and a second navigational condition requiring the vehicle to travel at a speed below a selected speed limit with an alarm response of notifying an extra-vehicular communication and command center of a violation, (f) a sixth safety zone having an elongated boundary of rectangular cross section, the sixth safety zone being an inclusive safety zone defining a travel path for the vehicle, the defined travel path having boundaries sufficiently distant from a normal path of the vehicle that the defined travel path does not interfere with normal operation of the vehicle, the sixth safety zone having a navigational condition requiring the vehicle to remain within the sixth safety zone with an alarm response to violation of the condition of overriding operator control of the vehicle to keep the vehicle within the sixth safety zone, (g) a seventh safety zone having an elliptically shaped boundary, the ellipse being defined along a major axis that remains parallel to a direction of motion of the vehicle, the seventh safety zone having a condition that the vehicle not enter the seventh safety zone and an alarm response to a violation of the condition of notifying the vehicle operator of the violation, (h) an eighth safety zone having an elliptically shaped boundary, the ellipse being defined along a major axis that remains parallel to a direction of motion of the vehicle, the eighth safety zone having a condition that the vehicle not enter the eighth safety zone and an alarm response to a violation of the condition of overriding operator control of the vehicle to prevent further penetration of the vehicle into the eighth safety zone;

a data processor mounted on the vehicle and receiving navigational status information from the navigational status determination system and determining in response to the received navigational status information and in response to the stored safety zone definition information whether or not a condition associated with a safety zone has been violated, the data processor generating alarm response information indicating an alarm response if a determination is made that a condition associated with a safety zone is violated; and an alarm response system receiving alarm response information from the data processor and executing an alarm response indicated by the received alarm response information, the alarm response system including (a) an audio alarm providing an audio alarm to the vehicle operator in response to audio alarm response information, (b) a visual alarm providing a visual alarm to the vehicle operator in response to visual alarm response information, (c) a vehicle operator override system overriding the vehicle operator with respect to a vehicle control function in response to operator override alarm response information, (d) a secure communication system communicating information indicating a condition violation in response to communication alarm response information, and (e) an extra-vehicular communication and command center located outside the vehicle and receiving information indicating a condition violation communicated by the secure communication system.

69. A vehicular safety method comprising the acts of:

generating navigational status information representing a navigational status of a vehicle, the navigational status information including information indicating the position of the vehicle;

storing information defining a an inclusive safety zone having a boundary that surrounds the vehicle;

storing at least one condition for operation of the vehicle, the at least one condition including the condition that the vehicle must not cross the boundary of the defined safety zone;

generating alarm information in response to the navigational status information when the navigational status information indicates that a stored condition for operation of the vehicle has been violated; and generating a protective response in response to the alarm information, the protective response including overriding operator control of the vehicle to tend to eliminate the violation of the stored condition for operation of the vehicle.

70. A vehicular safety method according to claim 69 further comprising storing information defining a plurality of safety zones and displaying to a vehicle operator an indication of a location of at least one of the safety zones relative to the location of the vehicle.

71. A vehicular safety method according to claim 69 wherein the vehicle is an airplane.

72. A vehicular safety method according to claim 69 wherein the vehicle is an automobile.

73. A vehicular safety method according to claim 69 wherein the vehicle is a ship.

74. A vehicular safety method according to claim 69, wherein generating navigational status information includes generating information indicating a direction of motion of the vehicle;

each defined protective zone has associated therewith a condition restricting operation of the vehicle;

wherein the act of generating alarm information includes the act of determining in response to the navigational status information whether or not a listed safety zone is occupied by the vehicle and if the safety zone is occupied by the vehicle, whether or not a condition of the occupied safety zone restricting operation of the vehicle has been violated by the vehicle;

wherein the act of generating alarm information includes the act of generating alarm information when it is determined that a safety zone has been violated by the vehicle, and wherein the generated protective response includes overriding operator control of the vehicle by changing a direction of motion of the vehicle.

75. A vehicular safety method according to claim 69, wherein the stored information includes information defining a plurality of safety zones, each safety zone having at least one navigational condition associated therewith and each navigational condition having at least one alarm response associated therewith, the defined safety zones including:

(a) a first safety zone defining boundaries of an available travel path for the vehicle, the first safety zone being an early warning safety zone having a navigational condition requiring the vehicle to remain within the boundaries of the first safety zone with an alarm response that the vehicle operator be notified of a violation, (b) a second safety zone defining boundaries of an available travel path for the vehicle, the second safety zone having a navigational condition requiring the vehicle to remain within the boundaries of the second safety zone with an alarm response of notifying an extra-vehicular communication and command center of a violation, and (c) a third safety zone defining boundaries of an available travel path for the vehicle, the third safety zone having a navigational condition requiring the vehicle to remain within the boundaries of the third safety zone with an alarm response to violation of the condition of overriding operator control of the vehicle to limit the distance that the vehicle can travel beyond a boundary of the third safety zone;

wherein the act of generating alarm response information includes the act of determining in response to the generated navigational status information and in response to the stored safety zone definition information whether or not a condition associated with a safety zone has been violated by the vehicle and includes the act of generating alarm response information indicating an alarm response if a determination is made that a condition associated with a safety zone is violated; and wherein the act of generating a protective response includes the act of executing an alarm response indicated by the generated alarm response information.

76. A vehicular safety method according to claim 69, wherein the act of storing information defining a plurality of safety zones includes the act of storing information defining a plurality of safety zones using a data store, each safety zone having at least one navigational condition associated therewith and each navigational condition having at least one alarm response associated therewith, the defined safety zones including:

(a) a first safety zone having a boundary surrounding an object, the first safety zone being an early warning exclusive safety zone having a navigational condition that the vehicle should not enter the first safety zone which navigational condition includes an alarm response including a notification to the vehicle operator that the vehicle has entered an exclusive safety zone, (b) a second safety zone having a boundary surrounding the object with the boundary of the second safety zone being inside of the boundary of the first safety zone, the second safety zone being a general warning exclusive safety zone having a navigational condition that the vehicle should not enter the second safety zone which navigational condition includes an alarm response including a notification to personnel outside the vehicle that the vehicle has entered an exclusive general warning safety zone, and (c) a third safety zone having a boundary surrounding the object with the boundary of the third safety zone being inside of the boundary of second safety zone, the third safety zone being an operator override safety zone having a navigational condition that the vehicle should not enter the third safety zone which navigational condition includes an alarm response including an operator override response in which the alarm response overrides an aspect of operator control of the vehicle to limit further motion of the vehicle into the third safety zone;

wherein the act of generating alarm information includes the act of generating alarm response information indicating an alarm response if a determination is made that a condition associated with a first, second or third safety zone which the vehicle has entered is being violated; and wherein the act of generating a protective response includes the act of executing an alarm response indicated by the generated alarm response information if a determination is made that a condition associated with a first, second or third safety zone which the vehicle has entered is being violated.

77. A vehicular safety method according to claim 69, further comprising the act of storing information defining a plurality of safety zones, each safety zone having at least one navigational condition associated therewith and each navigational condition having at least one alarm response associated therewith, the defined safety zones including:

(a) a first safety zone having a boundary surrounding an object, the first safety zone being an early warning exclusive safety zone having a navigational condition that the vehicle should not enter the first safety zone which navigational condition includes an alarm response of notification to the vehicle operator that the vehicle has entered an exclusive safety zone, (b) a second safety zone having a boundary surrounding the object, the second safety zone being a general warning exclusive safety zone having a navigational condition that the vehicle should not enter the second safety zone which navigational condition includes an alarm response including a notification to personnel outside the vehicle that the vehicle has entered an exclusive general warning safety zone, and (c) a third safety zone having a boundary that is surrounding the object, the third safety zone being an operator override safety zone having a navigational condition that the vehicle should not enter the third safety zone which navigational condition includes an alarm response including an operator override response in which the alarm response overrides an aspect of operator control of the vehicle to limit further motion of the vehicle into the third safety zone;

wherein the act of generating alarm response information includes the act of generating alarm response information indicating a particular alarm response if a determination is made that the vehicle has violated a condition associated with a first, second or third safety zone; and wherein the act of generating a protective response includes the act of executing the alarm response indicated by the generated alarm response information generated in response to a determination that the vehicle has violated a condition associated with a first, second or third safety zone.

78. A vehicular safety method according to claim 69, further comprising storing information defining an exclusive general warning safety zone having at least one navigational condition associated therewith with each navigational condition having at least one alarm response associated therewith, the defined exclusive general warning safety zone having a boundary surrounding an object and having a navigational condition that the vehicle should not enter the exclusive general warning safety zone, which navigational condition includes an alarm response including a notification to personnel outside the vehicle that the vehicle has entered an exclusive general warning safety zone.

79. A vehicular safety method comprising the acts of:

generating navigational status information representing position, speed and direction of motion of the vehicle using a navigational status determination system located on the vehicle, the navigational status determination system including a Global Positioning System (GPS) receiver;

storing at least one condition for operation of the vehicle including storing information defining a plurality of safety zones using a data store located on the vehicle, each safety zone having at least one navigational condition associated therewith and each navigational condition having at least one alarm response associated therewith, the defined safety zones including:

(a) a first safety zone having an elliptically shaped boundary, the ellipse being defined along a major axis, the first safety zone having a condition that the vehicle not enter the first safety zone and an alarm response to a violation of the condition of notifying the vehicle operator of the violation, and (b) a second safety zone having an elliptically shaped boundary, the ellipse being defined along a major axis, the second safety zone having a condition that the vehicle not enter the second safety zone and an alarm response to a violation of the condition of overriding operator control of the vehicle to prevent further penetration of the vehicle into the second safety zone;

rotating the major axes of the first and second safety zones in response to the navigational status information to maintain the major axes of the first and second safety zones parallel to the direction of motion of the vehicle;

determining in response to the generated navigational status information and in response to the stored safety zone definition information whether or not a condition associated with a safety zone which the vehicle has entered has been violated;

displaying to the vehicle operator a map of an area in the vicinity of the vehicle, the map including an indication of the location of each safety zone in the area that is displayed;

generating alarm information in response to the navigational status information when the navigational status information indicates that a stored condition for operation of the vehicle has been violated, the act of generating alarm information including the act of generating alarm response information indicating an alarm response associated with a violated condition if a determination is made that a condition associated with a safety zone has been violated; and generating a protective response in response to the alarm information, the act of generating a protective response including the act of executing an alarm response indicated by the generated alarm response information, the alarm response including at least one of the following:

(a) providing an audio alarm to the vehicle operator in response to audio alarm response information, (b) providing a visual alarm to the vehicle operator in response to visual alarm response information, (c) overriding the vehicle operator with respect to a vehicle control function in response to operator override alarm response information, (d) communicating information indicating a condition violation in response to communication alarm response information, and (e) receiving information indicating a condition violation communicated by the secure communication system.

80. A vehicular safety method comprising the acts of:
generating navigational status information representing a navigational status of a vehicle, the generated navigational status information including information representing position, speed and direction of motion of the vehicle;
storing at least one condition for operation of the vehicle, the act of storing including the act of storing information defining a plurality of safety zones, each safety zone having at least one navigational condition associated therewith and each navigational condition having at least one alarm response associated therewith, the defined safety zones including:
  (a) a first safety zone having an elongated boundary, the boundary being elongated along a major axis, the first safety zone having a condition that the vehicle not enter the first safety zone and an alarm response to a violation of the condition of notifying the vehicle operator of the violation, and
  (b) a second safety zone having an elongated boundary, the boundary being elongated along a major axis, the second safety zone having a condition that the vehicle not enter the second safety zone and an alarm response to a violation of the condition of overriding operator control of the vehicle to prevent further penetration of the vehicle into the second safety zone in the event the vehicle enters the second safety zone;
rotating the major axes of the first and second safety zones in response to the navigational status information to maintain the major axes of the first and second safety zones parallel to the direction of motion of the vehicle;
determining in response to the generated navigational status information and in response to the stored safety zone definition information whether or not a condition associated with a safety zone which the vehicle has entered has been violated;
displaying to the vehicle operator a map of an area in the vicinity of the vehicle, the map including an indication of the location of each safety zone in the area that is displayed;
generating alarm information in response to the navigational status information when the navigational status information indicates that a stored condition for operation of the vehicle has been violated, the act of generating alarm information including the act of generating alarm response information indicating an alarm response associated with a violated condition if a determination is made that a condition associated with a safety zone has been violated; and
generating a protective response in response to the alarm information, the act of generating a protective response including the act of executing an alarm response indicated by the generated alarm response information.

81. A vehicular safety method comprising the acts of:
generating navigational status information representing a navigational status of a vehicle, the generated navigational status information including information representing position, speed and direction of motion of the vehicle;
storing at least one condition for operation of the vehicle, the act of storing at least one condition including the act of storing information defining a safety zone having at least one navigational condition associated therewith and each navigational condition having at least one alarm response associated therewith, the defined safety zone having an elongated boundary, the boundary being elongated along a major axis, the safety zone having an associated condition that the vehicle not enter the safety zone and an alarm response to a violation of the condition of notifying the vehicle operator of the violation;
rotating the major axis of the safety zone in response to the navigational status information to maintain the major axis of the safety zone parallel to the direction of motion of the vehicle;
determining in response to the generated navigational status information and in response to the stored safety zone definition information whether or not a condition associated with the safety zone has been violated;
generating alarm information in response to the navigational status information when the navigational status information indicates that a stored condition for operation of the vehicle has been violated, the act of generating alarm information including the act of generating alarm response information indicating an alarm response associated with a violated condition if a determination is made that a condition associated with a safety zone has been violated; and
generating a protective response in response to the alarm information, the protective response including executing an alarm response indicated by the generated alarm response information.

82. A vehicular safety method comprising the acts of:
generating navigational status information representing a navigational status of a vehicle, the generated navigational status information including information representing position, speed and direction of motion of the vehicle;
storing at least one condition for operation of the vehicle, the act of storing at least one condition including the act of storing information defining a safety zone having at least one navigational condition associated therewith with each navigational condition having at least one alarm response associated therewith, the defined safety zone having an elongated boundary, the boundary being elongated along a major axis, the safety zone having an associated condition that the vehicle not enter the safety zone and an alarm response to a violation of the condition of overriding operator control of the vehicle to prevent further penetration of the vehicle into the safety zone;
rotating the major axis of the safety zone in response to the navigational status information to maintain the major axis of the safety zone parallel to the direction of motion of the vehicle;
determining in response to the generated navigational status information and in response to the stored safety zone definition information whether or not a condition associated with a safety zone which the vehicle has entered has been violated;
generating alarm information in response to the navigational status information when the navigational status information indicates that a stored condition for operation of the vehicle has been violated, the act of generating alarm information including the act of generating alarm response information indicating an alarm response associated with a violated condition if a determination is made that a condition associated with a safety zone has been violated; and
generating a protective response in response to the alarm information, the protective response including executing an alarm response indicated by the generated alarm response information.

83. A vehicular safety method comprising the acts of:

generating navigational status information including information representing the position a vehicle;

storing information defining a plurality of safety zones using a data store located in the vehicle, each safety zone having at least one navigational condition associated therewith and each navigational condition having at least one alarm response associated therewith, the defined safety zones including:

(a) a first safety zone defining an available travel path for the vehicle, the first safety zone being an early warning safety zone having a first navigational condition requiring the vehicle to remain within the first safety zone with an alarm response that the vehicle operator be notified of a violation and a second navigational condition requiring the vehicle to travel at a speed below a selected speed limit with an alarm response of notification of the vehicle operator of a violation, (b) a second safety zone defining an available travel path for the vehicle, the second safety zone having a first navigational condition requiring the vehicle to remain within the second safety zone with an alarm response of notifying an extra-vehicular communication and command center of a violation and a second navigational condition requiring the vehicle to travel at a speed below a selected speed limit with an alarm response of notifying an extra-vehicular communication and command center of a violation, and (c) a third safety zone defining an available travel path for the vehicle, the third safety zone having a navigational condition requiring the vehicle to remain within the third safety zone with an alarm response to violation of the condition of overriding operator control of the vehicle to limit the distance that the vehicle can travel beyond a boundary of the third safety zone;

determining in response to the generated navigational status information and in response to the stored safety zone definition information whether or not a condition associated with a safety zone has been violated by the vehicle;

displaying to the vehicle operator a map of a local area in the vicinity of the vehicle, the map including an indication of the location of each safety zone in the local area;

generating alarm response information indicating an alarm response if a determination is made that a condition associated with a safety is violated; and executing an alarm response indicated by the generated alarm response information.

84. A vehicular safety method comprising the acts of:

generating navigational status information representing position, speed and direction of motion of a vehicle using a navigational status determination system located on the vehicle, the navigational status determination system including a Global Positioning System (GPS) receiver;

storing information defining a plurality of safety zones using a data store located on the vehicle, each safety zone having at least one navigational condition associated therewith and each navigational condition having at least one alarm response associated therewith, the defined safety zones including:

(a) a first safety zone having a spherically shaped boundary having a selected radius and a center near a protected object, the first safety zone being an early warning exclusive safety zone having a navigational condition that the vehicle should not enter the first safety zone which navigational condition includes an alarm response including a notification to the vehicle operator that the vehicle has entered an exclusive safety zone, (b) a second safety zone having a spherically shaped boundary that is concentrically located within the boundary of the first safety zone and has a radius less than the radius of the first safety zone, the second safety zone being a general warning exclusive safety zone having a navigational condition that the vehicle should not enter the second safety zone which navigational condition includes an alarm response including a notification to personnel outside the vehicle that the vehicle has entered an exclusive general warning safety zone, (c) a third safety zone having a spherically shaped boundary that is concentrically located within the boundary of the second safety zone and has a radius less than the radius of the second safety zone, the third safety zone being an operator override safety zone having a navigational condition that the vehicle should not enter the third safety zone which navigational condition includes an alarm response including an operator override response in which the alarm response overrides an aspect of operator control of the vehicle to limit further motion into the third safety zone by the vehicle, (d) a fourth safety zone having an elongated boundary of rectangular cross section, the fourth safety zone being an inclusive safety zone defining a travel path for the vehicle, the fourth safety zone being an early warning safety zone having a first navigational condition requiring the vehicle to remain within the fourth safety zone with an alarm response that the vehicle operator be notified of a violation and a second navigational condition requiring the vehicle to travel at a speed below a selected speed limit with an alarm response of notification of the vehicle operator of a violation, (e) a fifth safety zone having an elongated boundary of rectangular cross section, the fifth safety zone being an inclusive safety zone defining a travel path for the vehicle, the fifth safety zone having a first navigational condition requiring the vehicle to remain within the fifth safety zone with an alarm response of notifying an extra-vehicular communication and command center of a violation and a second navigational condition requiring the vehicle to travel at a speed below a selected speed limit with an alarm response of notifying an extra-vehicular communication and command center of a violation, (f) a sixth safety zone having an elongated boundary of rectangular cross section, the sixth safety zone being an inclusive safety zone defining a travel path for the vehicle, the sixth safety zone having a navigational condition requiring the vehicle to remain within the sixth safety zone with an alarm response to violation of the condition of overriding operator control of the vehicle to keep the vehicle within the fifth safety zone, (g) a seventh safety zone having an elliptically shaped boundary, the ellipse being defined along a major axis that remains parallel to a direction of motion of the vehicle, the seventh safety zone having a condition that the vehicle not enter the seventh safety zone and an alarm response to a violation of the condition of notifying the vehicle operator of the violation, (h) an eighth safety zone having an elliptically shaped boundary, the ellipse being defined along a major axis that remains parallel to a direction of motion of the vehicle, the eighth safety zone having a condition that the vehicle not enter the eighth safety zone and an alarm response to a violation of the condition of overriding operator control of the vehicle to prevent further penetration of the vehicle into to eighth safety zone;

determining in response to the generated navigational status information and in response to the stored safety zone definition information whether or not a condition associated with a safety zone has been violated by the vehicle;

displaying to the vehicle operator a map of a local area in the vicinity of the vehicle, the map including and indication of the location of each safety zone in the local area;

generating alarm response information indicating an alarm response if a determination is made that a condition associated with a safety zone has violated by the vehicle; and executing an alarm response indicated by the generated alarm response information, the alarm response including at least one of the following:
 (a) providing an audio alarm to the vehicle operator in response to audio alarm response information,
 (b) providing a visual alarm to the vehicle operator in response to visual alarm response information,
 (c) overriding the vehicle operator with respect to a vehicle control function in response to operator override alarm response information,
 (d) communicating information indicating a condition violation in response to communication alarm response information, and
 (e) receiving information indicating a condition violation communicated by the secure communication system.

85. A vehicular safety system comprising:

means for generating navigational status information representing a navigational status of a vehicle, including speed and direction of motion of the vehicle;

means for storing information, the means for storing information storing information defining an elongated safety exclusive safety zone extending about an object with the direction of elongation being maintained parallel to the direction of motion of the vehicle and storing at least one condition for operation of the vehicle, the at least one condition including a condition that the vehicle should not enter the exclusive safety zone;

means for generating exclusive safety zone alarm information in response to the navigational status information when the navigational status information indicates that a stored condition for operation of the vehicle has been violated; and means for producing a safety response in response to the alarm information, the safety response including changing the direction of motion of the vehicle to prevent the vehicle from contacting the object.

86. A vehicular safety system according to claim 85, wherein the means for storing includes means for storing information defining a plurality of inclusive safety zones, each inclusive safety zone having at least one navigational condition associated therewith and each navigational condition having at least one alarm response associated therewith, the defined safety zones including:
 (a) a first inclusive safety zone defining boundaries of an available travel path for the vehicle, the first safety zone being an early warning safety zone having a navigational condition requiring the vehicle to remain within the boundaries of the first safety zone with an alarm response that the vehicle operator be notified of a violation,
 (b) a second inclusive safety zone defining boundaries of an available travel path for the vehicle, the second safety zone having a navigational condition requiring the vehicle to remain within the boundaries of the second safety zone with an alarm response of notifying an extra-vehicular communication and command center of a violation, and
 (c) a third inclusive safety zone defining boundaries of an available travel path for the vehicle, the third safety zone having a navigational condition requiring the vehicle to remain within the boundaries of the third safety zone with an alarm response to violation of the condition of overriding operator control of the vehicle to limit the distance that the vehicle can travel beyond a boundary of the third safety zone;

further comprising means for determining in response to the generated navigational status information and in response to the stored first, second and third inclusive safety zone definition information whether or not a condition associated with a first, second or third inclusive safety zone has been violated by the vehicle;

wherein the means for determining includes a data processing system generating inclusive safety zone alarm response information indicating an inclusive safety zone alarm response if a determination is made that a condition associated with a first, second or third inclusive safety zone is violated; and wherein the means for producing a safety response includes means for executing an inclusive safety zone alarm response indicated by the generated inclusive safety zone alarm response information.

87. A vehicular safety system according to claim 85, wherein the means for storing information includes means for storing a list of one or more safety zones, each safety zone having associated therewith a condition restricting operation of the vehicle; and wherein the means for generating exclusive safety zone alarm information includes a data processor determining in response to the navigational status information whether or not a listed safety zone is occupied by the vehicle and if the safety zone is occupied by the vehicle, whether or not a condition of the occupied safety zone restricting operation of the vehicle has been violated by the vehicle, the data processor generating alarm information only when it is determined that a condition of a safety zone has been violated by the vehicle.

88. A vehicular safety system according to claim 85,
wherein the means for storing information stores information further defining at least one exclusive general warning safety zone having at least one navigational condition associated therewith with each navigational condition having at least one alarm response associated therewith, the defined at least one exclusive general warning safety zone having a boundary surrounding an object and having a navigational condition that the vehicle should not enter the exclusive general warning safety zone, which navigational condition includes an alarm response including a notification to personnel outside the vehicle that the vehicle has entered an exclusive general warning safety zone; and wherein the means for producing a safety response includes an alarm response system executing the alarm response associated with the violated condition of the exclusive general warning safety zone by the vehicle, the data processor generating alarm information when it is determined that a condition of the exclusive general warning safety zone has been violated by the vehicle.

89. A vehicular safety system according to claim 85,
wherein the vehicle is an airplane; and wherein the means for storing information stores map information defining a topographical map of a region through which the vehicle might be expected to travel and wherein the defined safety zone extends ahead of the vehicle for a selected distance and moves with the vehicle, the safety zone having an associated condition that the vehicle not descend below an adaptively selected altitude floor which is set at a selected distance above a highest point on the ground within the area of the safety zone as indicated by the stored map information.

90. A vehicular safety system according to claim 89,
wherein the safety zone is an override response safety zone having as a response to a violation of the altitude floor condition, a response by the alarm response system of causing the vehicle to climb above the selected altitude floor.

* * * * *